United States Patent [19]

Suzumura et al.

[11] Patent Number: 5,460,148
[45] Date of Patent: Oct. 24, 1995

[54] ASSIST AIR CONTROL SYSTEM FOR INTERNAL COMBUSTION ENGINE

[75] Inventors: Toshihiro Suzumura, Nagoya; Hisashi Iida, Aichi; Keigi Honjoh, Anjo, all of Japan; Kenji Ikuta, Rolling Hills Estates, Calif.; Shigenori Isomura, Kariya, Japan

[73] Assignee: Nippondenso Co., Ltd., Kariya, Japan

[21] Appl. No.: 190,932

[22] Filed: Feb. 3, 1994

[30] Foreign Application Priority Data

Feb. 4, 1993 [JP] Japan .................................. 5-017542
Oct. 15, 1993 [JP] Japan .................................. 5-258484

[51] Int. Cl.⁶ .................................................. F02B 23/00
[52] U.S. Cl. .......................................... 123/585; 123/588
[58] Field of Search .............................. 123/531, 585, 123/586, 588

[56] References Cited

U.S. PATENT DOCUMENTS

| 4,387,696 | 6/1983 | Yogo et al. | 123/585 |
| 4,475,486 | 10/1984 | Kessler | 123/442 |
| 4,517,941 | 5/1985 | Nakagawa | 123/586 |

FOREIGN PATENT DOCUMENTS

| 0360040 | 3/1990 | European Pat. Off. . |
| 55-9555 | 3/1980 | Japan . |
| 196457 | 4/1989 | Japan . |
| 2038416 | 7/1980 | United Kingdom . |
| 2251027 | 6/1992 | United Kingdom . |

*Primary Examiner*—Noah P. Kamen
*Attorney, Agent, or Firm*—Cushman, Darby & Cushman

[57] ABSTRACT

An assist air control system for an internal combustion engine introduces, via an assist air passage bypassing a throttle valve, a portion of intake air flowing in an intake pipe upstream of the throttle valve to an area where fuel is injected from a fuel injection valve, so as to facilitate atomization of the injected fuel. The assist air passage includes a flow control unit for opening and closing the assist air passage. The degree of opening of the assist air passage is limited to a value that is reduced as an engine temperature increases, while increased as an engine load increases. The opening degree of the flow control unit may be controlled electrically, mechanically, or both. In this case, the electrically controlled opening degree value is set smaller than the mechanically controlled opening degree value.

8 Claims, 21 Drawing Sheets

20°C

80°C

THROTTLE FULLY CLOSED

20°C

80°C

THROTTLE FULLY OPENED

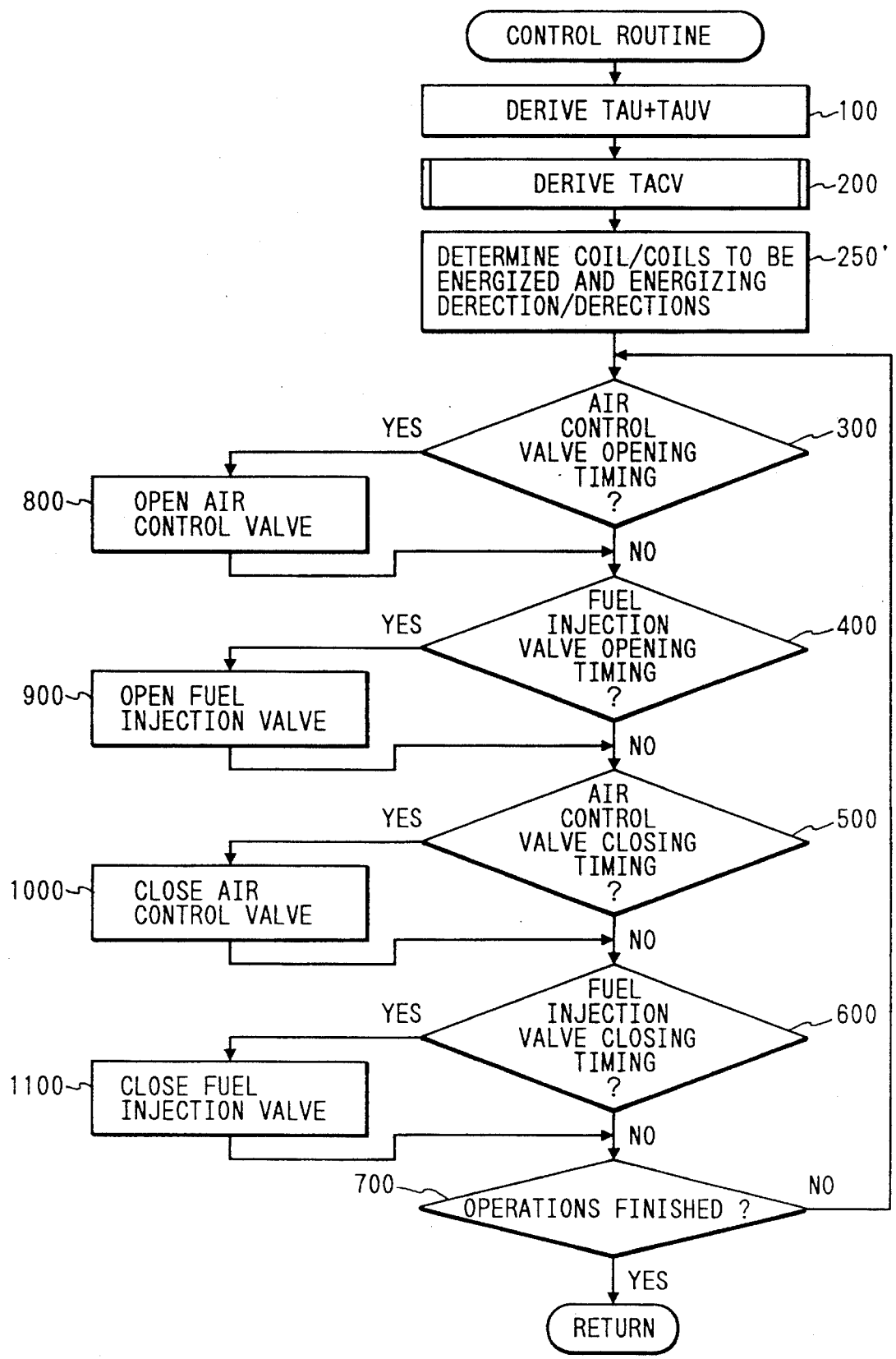

ASSIST AIR CONTROL SYSTEM FOR INTERNAL COMBUSTION ENGINE

BACKGROUND OF THE INVENTION

1. Field of the Invention

The present invention relates to an assist air control system for an internal combustion engine, which controls the supplied amount of assist air to facilitate atomization of fuel injected through a fuel injection valve by opening and closing an assist air passage.

2. Description of the Prior Art

As disclosed in Japanese First (unexamined) Patent Publication No. 1-96457, there has been proposed a so-called timed air mixture system (hereinafter referred to as "timed AMS"), wherein a flow control valve provided in an assist air passage opens and closes synchronously with fuel injected from a fuel injection valve so as to effectively atomize the injected fuel.

In the conventional timed AMS, when the assist air passage remains fully opened due to failure of the flow control valve or its associated control means, assist air continues to be sucked into the engine via the fully-opened assist air passage.

This condition does not cause problems when the throttle valve is significantly opened, since the ratio of assist air relative to the total amount of intake air supplied to the engine is small.

However, when the throttle valve is only slightly open or fully closed, such as during engine idling, the amount of intake air is adjusted by opening and closing the flow control valve to adjust the supply of assist air. Accordingly, when assist air is continuously supplied to the engine via the fully-opened assist air passage as described above, excess air is supplied to the engine, which causes overrunning of the engine.

On the other hand, as disclosed in Japanese Second (examined) Patent Publication No. 55-9555, there has been proposed a system wherein an air amount adjusting valve of a bypass air duct is controlled by means of a mechanical linkage which works in response to engine coolant temperature, so as to facilitate fuel atomization, particularly at a low engine temperature for effective engine start-up. Specifically, the opening of the air amount adjusting valve is increased as the engine temperature is reduced, and is decreased as the engine temperature increases so that the amount of air supplied via the bypass air duct is inversely proportional to the engine temperature.

When this prior art system is combined with the foregoing timed AMS, the combined system facilitates the warming up of the engine by supplying a large amount of assist air to the cold engine, and prevents overrunning of the engine by reducing the opening of the flow control valve as the engine temperature increases, so as to reduce the amount of assist air supplied to the engine.

However, in such a combined system, since the opening of the flow control valve varies with engine temperature not only during the engine idling but also during high-load operation, the combined system is not effective during high-load operation.

Specifically, during high-load operation, the throttle valve is opened wide and the amount of intake air sucked into the engine is large, thus the intake pressure downstream of the throttle valve is increased. Accordingly, the pressure differential between the intake pressure and atmospheric pressure is reduced. As a result, the amount of assist air is also reduced, thus reducing the atomization of the injected fuel. In the foregoing combined system, the opening of the flow control valve is reduced in response to an increase in engine temperature. Accordingly, during high-load operation, the flow control valve works as a throttling against the assist air to generate a pressure loss in the assist air passage so that the assist air supply is further reduced. This leads to poor atomization of the injected fuel so that the timed AMS does not work effectively during high-load operation.

SUMMARY OF THE INVENTION

Therefore, it is an object of the present invention to provide an improved assist air control system for an internal combustion engine.

To accomplish the above-mentioned and other objects, according to one aspect of the present invention, an assist air control system for an internal combustion engine comprises an assist air passage for establishing communication between the upstream side of the intake pipe throttle valve and the injection hole of a fuel injection valve, bypassing the throttle valve; means for opening and closing the assist air passage; and opening degree limiting means for limiting the opening of the assist air passage such that the opening is reduced as engine temperature increases, and increased as engine load increases.

According to another aspect of the present invention, an assist air control system for an internal combustion engine comprises an assist air passage for establishing communication between the upstream side of an intake pipe throttle valve and the injection hole of a fuel injection valve, bypassing the throttle valve; open-close means for opening and closing the assist air passage; and open-close control means for controlling the opening and closing of the open-close means, such that the opening of the assist air passage is reduced as engine temperature increases, and increased as engine load increases.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the scope of the present invention.

In the drawings:

FIG. 23 is a flowchart showing a control routine to be executed by the ECU for controlling the operations of the fuel injection valves and the air control valve according to the third preferred embodiment;

DESCRIPTION OF THE PREFERRED EMBODIMENT

Figure 1:
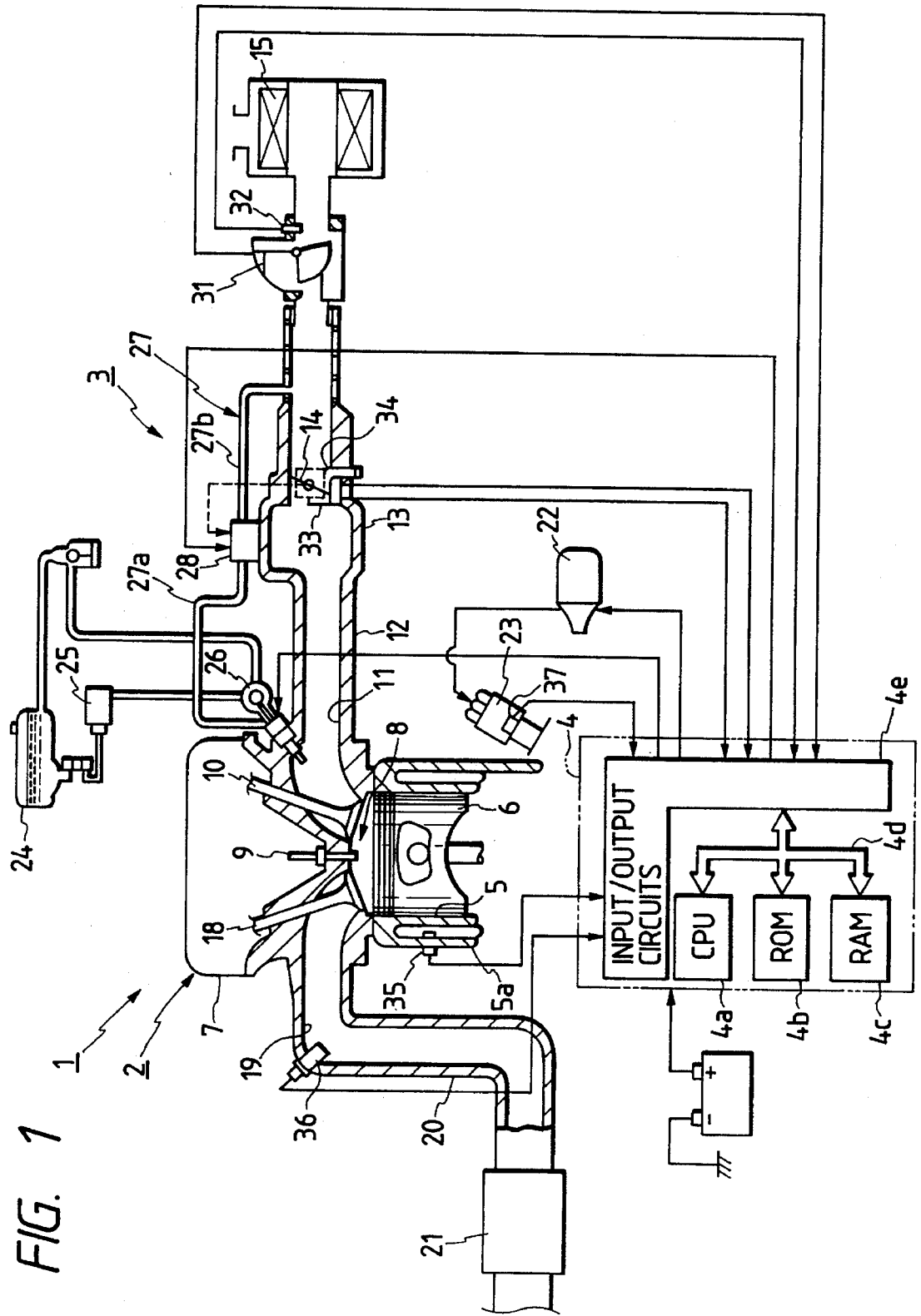
FIG. 1 is a schematic diagram showing the entire structure of a fuel injection system incorporating an assist air control system according to a first preferred embodiment of the present invention.

FIG. 1 is a schematic diagram showing the entire structure of a fuel injection system 1 for an internal combustion engine 2, wherein an assist air control system according to a first preferred embodiment of the present invention is incorporated.

In FIG. 1, the fuel injection system 1 includes the engine 2, an air mixture device 3 and an electronic control unit ("ECU") 4 which controls the operations of the engine 2 and the air mixture device 3 according to stored programs. The engine 2 is a four-cylinder type in this embodiment and includes combustion chambers 8 each defined by a cylinder 5 and a cylinder head 7 with a piston 6 disposed therein. A spark plug 9 is arranged to be exposed to each combustion chamber 8.

The induction system of the engine 2 includes intake ports 11 each communicating at its downstream side with the combustion chamber 8 via an intake valve 10, and at its upstream side with a common intake pipe 12, which includes a serge tank 13 for absorbing pulsation of intake air flows, a throttle valve 14 which controls an amount of intake air to be fed to the combustion chambers 8, and an air cleaner 15.

The exhaust system of the engine 2 includes exhaust ports 19 each communicating at its upstream side with the combustion chamber 8 via an exhaust valve 18, and at its downstream side with a common exhaust pipe 20 with a catalytic converter 21 provided therein.

The ignition system of the engine 2 includes an igniter 22 for producing a voltage sufficient for generating ignition sparks at the respective spark plugs 9, and a distributor 23 for distributing the high voltage generated at the igniter 22 to the corresponding spark plugs 9 according to a monitored angular position of an engine crankshaft (not shown).

The fuel system of the engine 2 includes a fuel tank 24, a fuel pump 25 for pressuring the fuel, and electromagnetic fuel injectors or solenoid fuel injection valves 26 each injecting the pressurized fuel into the corresponding intake port 11.

The air mixture device 3 includes an assist air passage 27 for introducing a portion of the intake air in the intake pipe 12 from the upstream side of the throttle valve 14 to the vicinities of injection holes of the fuel injection valves 25, for facilitating atomization of the injected fuel. Specifically, the assist air passage 27 includes an air introducing section 27a for receiving a portion of the intake air upstream of the throttle valve 14, and four air discharging sections 27b branching from the air introducing section 27a for conducting the received intake air to the vicinities of the injection holes of the fuel injection valves 26. The air mixture device 3 further includes an air control valve 28, in the form of a two-port two-position solenoid valve, mounted to an external wall of the intake pipe 12 in the neighborhood of the throttle valve 14. The air control valve 28 is arranged in the air introducing section 27a of the air assist passage 27 and controlled by the ECU 4 to be opened and closed for opening and closing the air introducing section 27a relative to the air discharging sections 27b so as to control communication between the intake pipe 12 on the upstream side of the throttle valve 14 and the areas where the fuel is injected via the injection holes of the fuel injection valves 26.

The fuel injection system 1 further includes various sensors, such as, a van type airflow meter 31 upstream of the throttle valve 14 in the intake pipe 12, an intake air temperature sensor 32 provided in the airflow meter 31, a throttle position sensor 33 for producing a signal indicative of an opening degree of the throttle valve 14, an idle switch 34 for producing a signal indicative of a fully-closed condition of the throttle valve 14, an engine coolant temperature sensor 35 mounted to a cylinder block 5a, an oxygen sensor 36 provided in the exhaust pipe 20 for monitoring residual oxygen concentration in the exhaust pipe 20 for monitoring residual oxygen concentration in the exhaust gas to produce an air-fuel ratio indicative signal to be used in the air-fuel ratio feedback control, and a rotation angle sensor 37, doubling as an engine speed sensor, for producing a pulse signal per 1/24 rotation of a camshaft of the distributor 23, i.e. per 30° CA (crank angle).

ECU 4 controls the operations of the engine 2 and the air mixture device 3 based on the received sensor signals. The ECU 4 includes CPU 4a, ROM 4b and RAM 4c forming a logical operation circuit which is connected to input/output circuits 4e via a common bus 4d for communication with peripheral devices including the foregoing sensors, fuel injection valves 26, distributor 23, air control valve 28 and so on.

Figure 2:
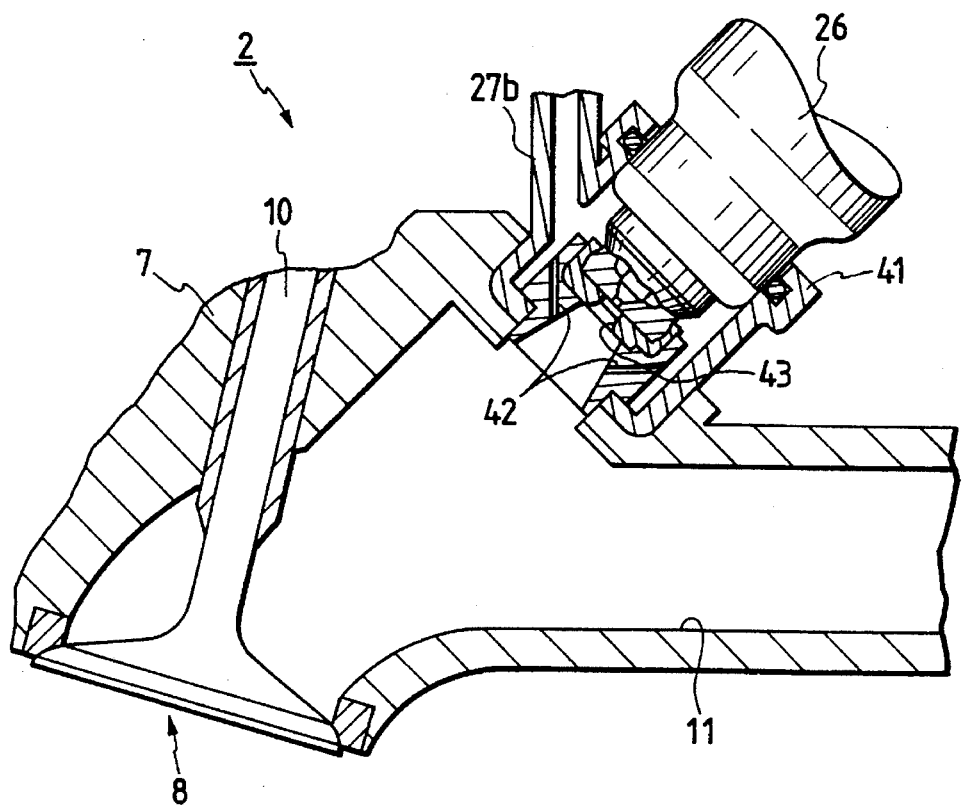
FIG. 2 is a partial enlarged sectional view showing the structure around the injection hole of a fuel injection valve.

FIG. 2 is a partial enlarged sectional view showing the structure around the injection hole of the fuel injection valve 26.

As shown in FIG. 2, air mixture socket 41 is fixedly mounted to cylinder head 7 at the intake port 11 to provide the area where injected fuel is mixed with the intake air supplied via the air discharging section 27b (hereinafter, this intake air will be referred to as "assist air"). Specifically, air mixture socket 41 is provided at a downstream end of each air discharging section 27b so as to hold a tip portion of the fuel injection valve 26 is a hermetic condition. The air mixture socket 41 is formed with a fuel injecting hole 43 facing the injection hole of the fuel injection valve 26 and the further formed with a plurality of air injecting holes 42 for injecting the assist air conducted by the air discharging section 27b into the area where the fuel is injected via the fuel injecting hole 43, so as to facilitate atomization of the injected fuel with the injected assist air. It is to be noted that cross-sectional passage areas of the air introducing section 27a as well as the air control valve 28 when fully opened are respectively set about three times as large as the sum of the cross-sectional areas of all the air injecting holes 42 for the four engine cylinders. Accordingly, each injecting hole 42 works as a throttling against the assist air to maximize the flow of the assist air.

During engine operation, the inside of intake port 11 is maintained at a vacuum pressure, while the inside of the intake pipe 12 upstream of the throttle valve 14 is maintained at a pressure close to the atmospheric pressure. Due to the pressure differential therebetween, assist air is introduced to the air mixture socket 41 from the upstream side of the throttle valve 14 through the assist air passage 27 when the air control valve 28 is opened. The assist air is then injected through each air injecting hole 42 of the air mixture socket 41 to hit and atomize the fuel in the form of droplets injected from the fuel injection valve 26 via the fuel injecting hole 43. As described above, the flow velocity of the assist air is maximized when passing through the air injecting holes 42. The kinetic energy of the assist air flow is used to effectively atomize the injected fuel. The atomized fuel then flows into the intake port 11 as a jet flow.

It is to be noted that the fuel injection system 1 in this preferred embodiment is not provided with an air supply passage used exclusively for ensuring the idle running of the engine 2. As will be described later in detail, in this preferred embodiment, engine idle operation is ensured solely by the assist air. In the case of a four-cylinder engine, the sum of the cross-sectional areas of the air injecting holes 42 for the four engine cylinders is set such that ample air is supplied for fast idling in cold weather, for example 16 m$^3$/h.

Figure 3:
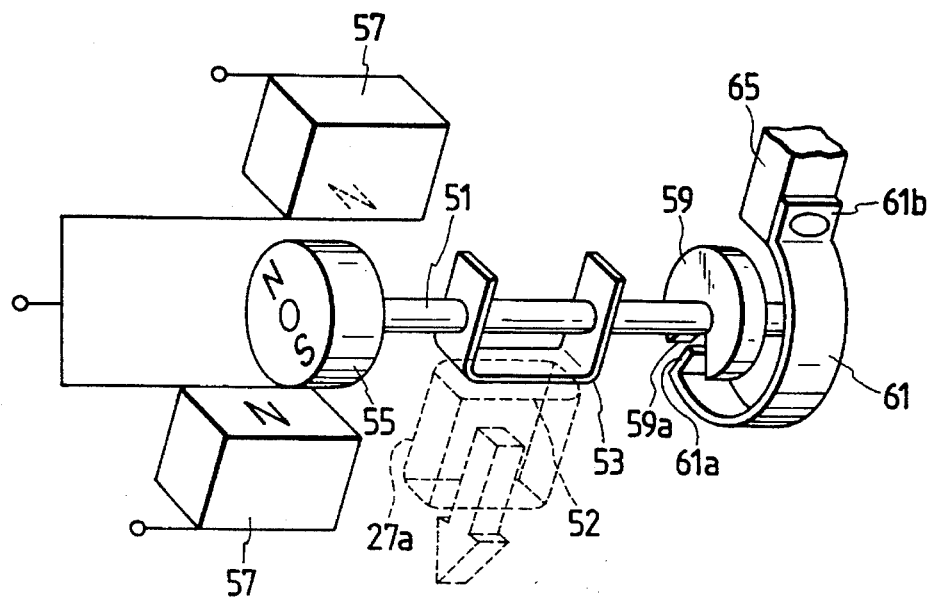
FIG. 3 is a schematic perspective view showing the basic structure of an air control valve to be used in the first preferred embodiment.

FIG. 3 is a schematic perspective view showing the basic structure of the air control valve 28. In FIG. 3, the air control valve 29 includes a rotation shaft 51 rotatably mounted to a housing 49 (see FIGS. 5(A), 5(B), 6(A) and 6(B)), a rotary-type valve member 53 fixedly mounted on the rotation shaft 51 for opening and closing air outlet 52 formed at the housing 49 in response to rotation of the rotation shaft 51, a permanent magnet 55 fixed to one end of the rotation shaft 51 for electromagnetically controlling the opening and closing of the valve member, and an exciting coil 57 arranged close to the permanent magnet 55 and supplied with a control signal according to a later-described control routine for varying a magnetic field therearound. The air control valve 28 further includes a disc-shaped guard member 59 having in part a cutout or a V-shaped recess 59a and fixed to the other end of the rotation shaft 51, and a bimetal 61 having a bent tip portion 61a received in the recess 59a of the guard member 59 and a base end 61b supported to the housing 49 via a coil spring 63 (see FIGS. 5(A), 5(B), 6(A) and 6(B)) and operatively connected to the throttle valve 14 via a linkage 65. Accordingly, the position of tip portion 61a changes in the recess 59a depending on the temperature and the degree of opening of the throttle valve 14 so as to limit the rotation range of the guard member 59, and thus the rotation range of the valve member 53.

Figure 4A:
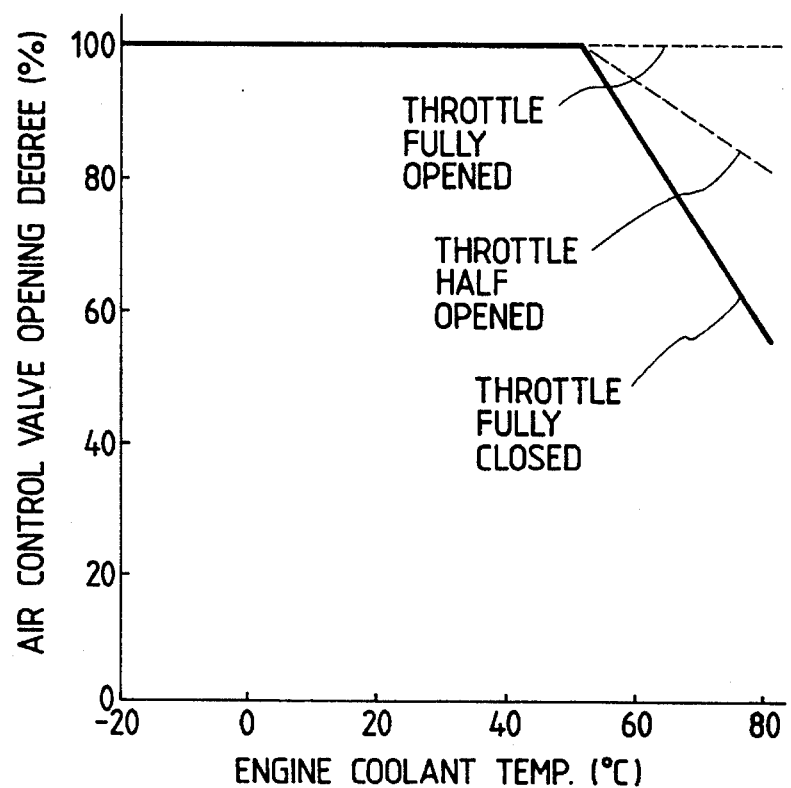
FIG. 4(A) is a characteristic diagram showing the degree of opening of the air control valve relative to engine coolant temperature and the degree of opening of the throttle valve.

FIG. 4(A) is a characteristic diagram showing the degree of opening of the air control valve 28 relative to the engine coolant temperature and the degree of opening of the throttle valve 14. As can be appreciated, the degree of opening of the air control valve 28 depends on the rotation range of the guard member 59 and thus that of the valve member 53. Specifically, as seen from FIG. 4(A), the temperature characteristic of the bimetal 61 and the mechanical characteristic of the linkage 65 are chosen such that, when the engine coolant temperature is higher than 50° C., the rotation range of the guard member 59 and thus that of the valve member 53 change in inverse proportion to the increase of the engine coolant temperature while in proportion to the increase of the degree of opening of throttle valve 14.

Since the air control valve 28 is mounted to the external wall of the intake pipe 12 in the vicinity of the throttle valve 14 and the engine cooling water is circulated to the vicinity of the throttle valve 14 by piping for antifreezing in the cold weather, the temperature exerted on the bimetal 61 is equal to the engine coolant temperature which is substantially equal to the engine temperature.

Figure 5A:
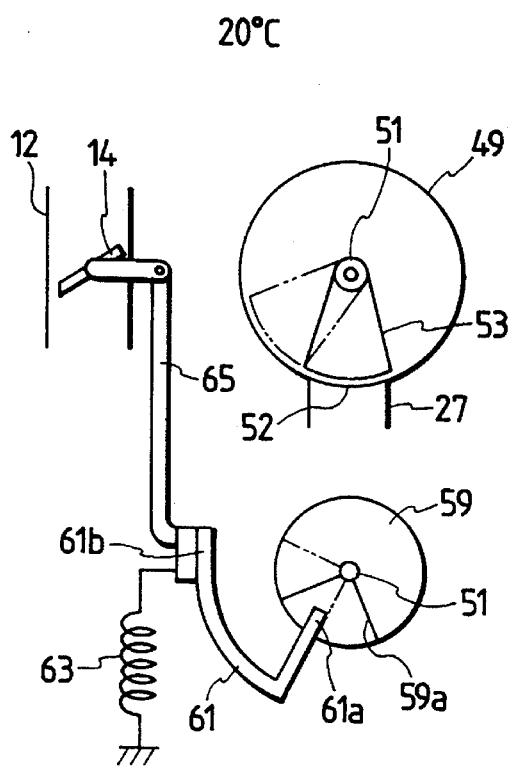
FIG. 5(A) is a diagram explaining rotation ranges of a guard member and a rotary-type valve member of the air control valve when the throttle valve is fully closed at an engine coolant temperature of 20° C.

As shown in FIG. 5(A), when the throttle valve 14 is fully closed at an engine coolant temperature of 20° C., the bimetal 61 displaced downward by means of the linkage 65 is contracted so that a distal end of the tip portion 61a is rotated upward by about 30° from its lowermost position. Accordingly, the valve member 53, that is, the air control valve 28 is operated between its fully (100%) opened position and its fully closed position relative to the air output 52 without limitation.

Figure 5B:
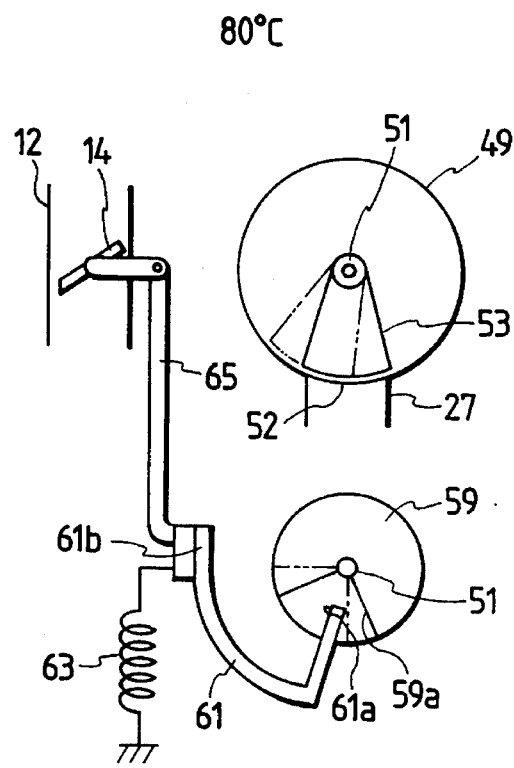
FIG. 5(B) is a diagram explaining rotation ranges of the guard member and the rotary-type valve member when the throttle valve is fully closed at an engine coolant temperature of 80° C.

On the other hand, as shown in FIG. 5(B), when the throttle valve 14 is fully closed at an engine coolant temperature of 80° C., the bimetal 61 displaced downward by means of the linkage 65 is extended so that the distal end of the tip portion 61a is located at its lowermost position. Accordingly, the rotation of guard member 59 and thus that of valve member 53 are limited by the tip portion 61a of the bimetal 61 so that the air control valve 28 is operated between its opened (about 60%) position and its fully closed position.

As will be described later, in the normal operation of the air control vale 28, the valve opening time of the air control valve 28 is controlled to adjust the intake air quantity supplied to the engine 2 during the engine idling to achieve proper idling engine speed. On the other hand, if air control valve 28 is not continuously open during engine idling, intake air continues to be sucked into the engine 2 via the continuously-opened air control valve 28 so that the idling speed increases. As a result, the engine speed exceeds an overrun regulating speed or regulated idling speed.

Figure 4B:
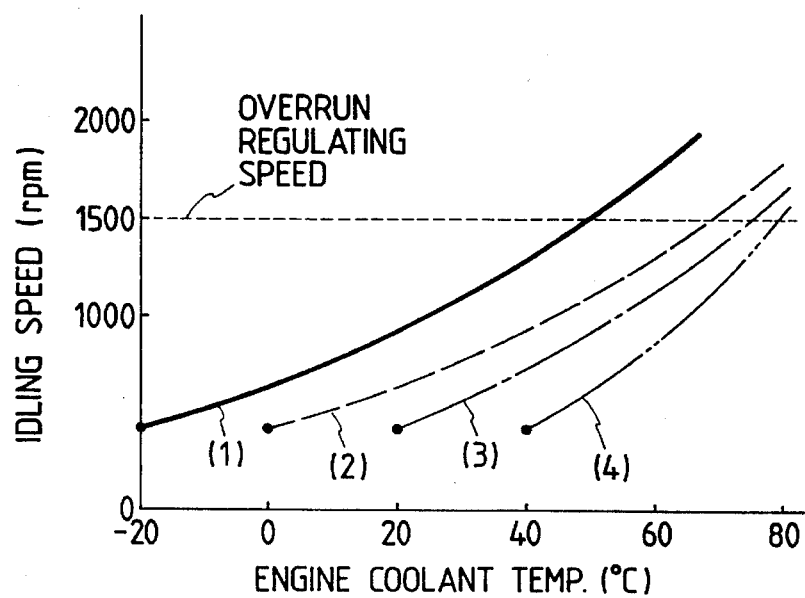
FIG. 4(B) is a characteristic diagram showing the relationship between engine coolant temperature and engine idling speed.

FIG. 4(B) is a characteristic diagram showing characteristic lines (1), (2), (3) and (4) each representing a relationship between coolant temperature and idling speed. Specifically, the characteristic lines (1), (2), (3) and (4) have been obtained through experiment, wherein the engine 2 is started with engine cooling water at temperatures of −20° C., 0° C., 20° C. and 40° C., respectively, and continues to be in an idle running state with an intake air supply of 18 m$^3$/h. The intake air supply of 18 m$^3$/h is a sum of the assist air (16 m$^3$/h) supplied to the engine 2 with air control valve 28 fully opened and the intake air (2 m$^3$/h) leaked through the fully-closed throttle valve 14.

As shown by the characteristic line (1) where the engine 2 is started at the engine coolant temperature of −20° C., when the engine coolant temperature exceeds 50° C., the idling speed exceeds the overrun regulating speed of 1,500 rpm. On the other hand, as shown by the characteristic lines (2), (3) and (4), when the engine coolant temperature at the start-up of the engine 2 is higher, the engine speed exceeds the regulated idling speed of 1,500 rpm when the engine coolant temperature exceeds 50° C. As appreciated from this, the relationship between the idling engine speed and the engine coolant temperature (i.e. the engine temperature) depends on the viscosity reduction of the engine oil, the facilitation of the ignition and the like caused by the increase of the engine temperature which the intake air quantity is kept constant.

Now, the engine coolant temperature is −20° C. at the start-up of the engine 2 and the idle operation continues with the throttle valve 14 fully closed and air control valve 28 remains open due to, for example, accidental short circuit or open circuit of the coil 57 or malfunction of the ECU 4 in sending a later-described duty signal to the coil 57. In this condition, when the engine coolant temperature exceeds 50° C., the opening of the air control valve 28 or valve member 53 is limited to a smaller value in inverse proportion to the increase of the engine coolant temperature as shown in FIG. 4(A) to reduce the supply of assist air so that the amount of intake air supplied to the engine 2 for the idle operation is reduced. Accordingly, intake air quantity Q measured by the airflow meter 31 is reduced, and thus, basic fuel injection amount TAUO from the fuel injection valve 26 which is derived from the intake air quantity Q and engine speed Ne as will be described later, is also reduced to prevent the idling engine speed from exceeding the overrun regulating speed.

As appreciated from the foregoing description, in this preferred embodiment, when engine idling continues with the throttle valve fully closed and with air control valve 28 continuously open, the opening of air control valve 28 is limited to suppress the idling engine speed to prevent the overrunning of the engine 2.

Figure 6A:
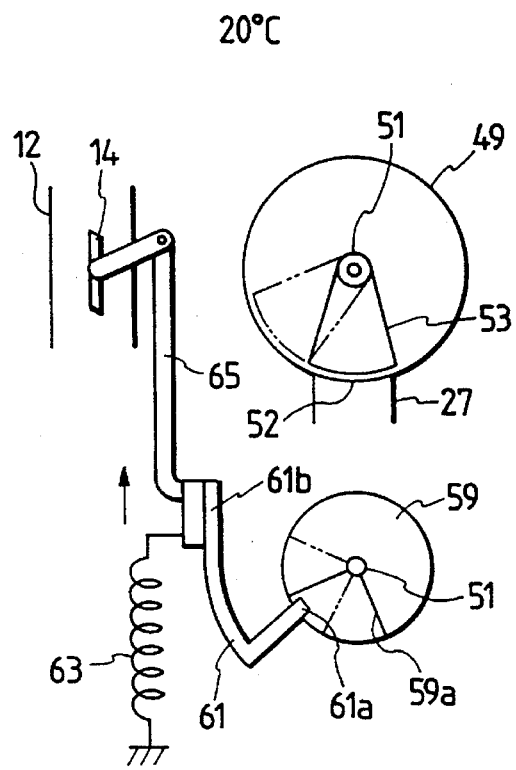
FIG. 6(A) is a diagram explaining rotation ranges of the guard member and the rotary-type valve member when the throttle valve is fully opened at an engine coolant temperature of 20° C.
Figure 6B:
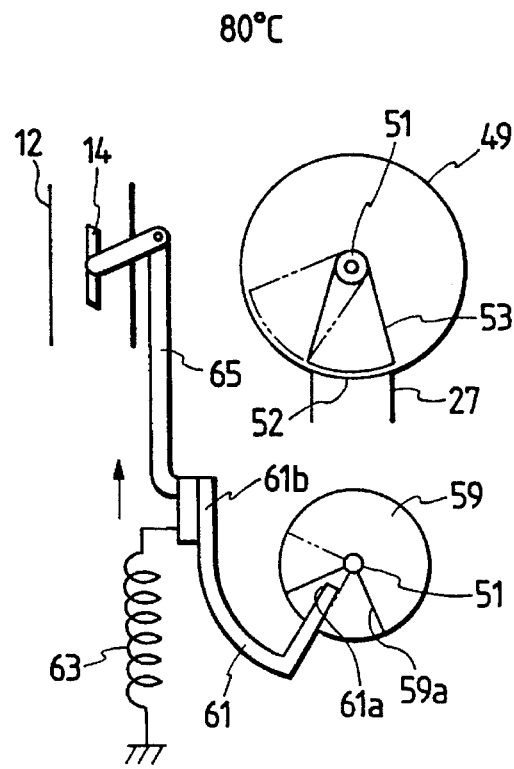
FIG. 6(B) is a diagram explaining rotation ranges of the guard member and the rotary-type valve member when the throttle valve is fully opened at an engine coolant temperature of 80° C.

As shown in FIGS. 6(A) and 6(B), when the throttle valve 14 is fully opened, since the bimetal 61 is displaced upward by means of the linkage 65 irrespective of being contracted at an engine coolant temperature of 20° C. or extended at an engine coolant temperature of 80° C., the distal end of the tip portion 61a is rotated upward by about 50° C. to 30° C. from its lowermost portion. Accordingly, the valve member 53 (that is, the air control valve 28) is operated between its fully (100%) opened position and its fully closed position relative to the air outlet 52 without limitation of the rotation of the guard member 59 due to the tip portion 61a of the bimetal 61. As a result, when throttle valve 14 is fully opened to minimize the pressure differential between the upstream and downstream ends of the assist air passage 27, 100% opening of the air control valve 28 is ensured to minimize pressure loss of the assist air at air control valve 28 to ensure a sufficient amount of assist air to effectively atomize the injected fuel.

As appreciated from the foregoing description, according to this preferred embodiment, when the throttle valve 14 is opened so as to reduce the pressure differential between intake port 11 and upstream portion of the throttle valve 14 (close to the atmospheric pressure), the opening of the air control valve 28 is proportional to the opening of the throttle valve 14 at the engine coolant temperature over 50° C. Accordingly, the opening of the air control valve 28 increases as the opening of the throttle valve 14 increases to reduce the above-noted pressure loss so that a sufficient amount of assist air is supplied to effectively atomize the injected fuel from the fuel injection valve 26.

Figure 7:
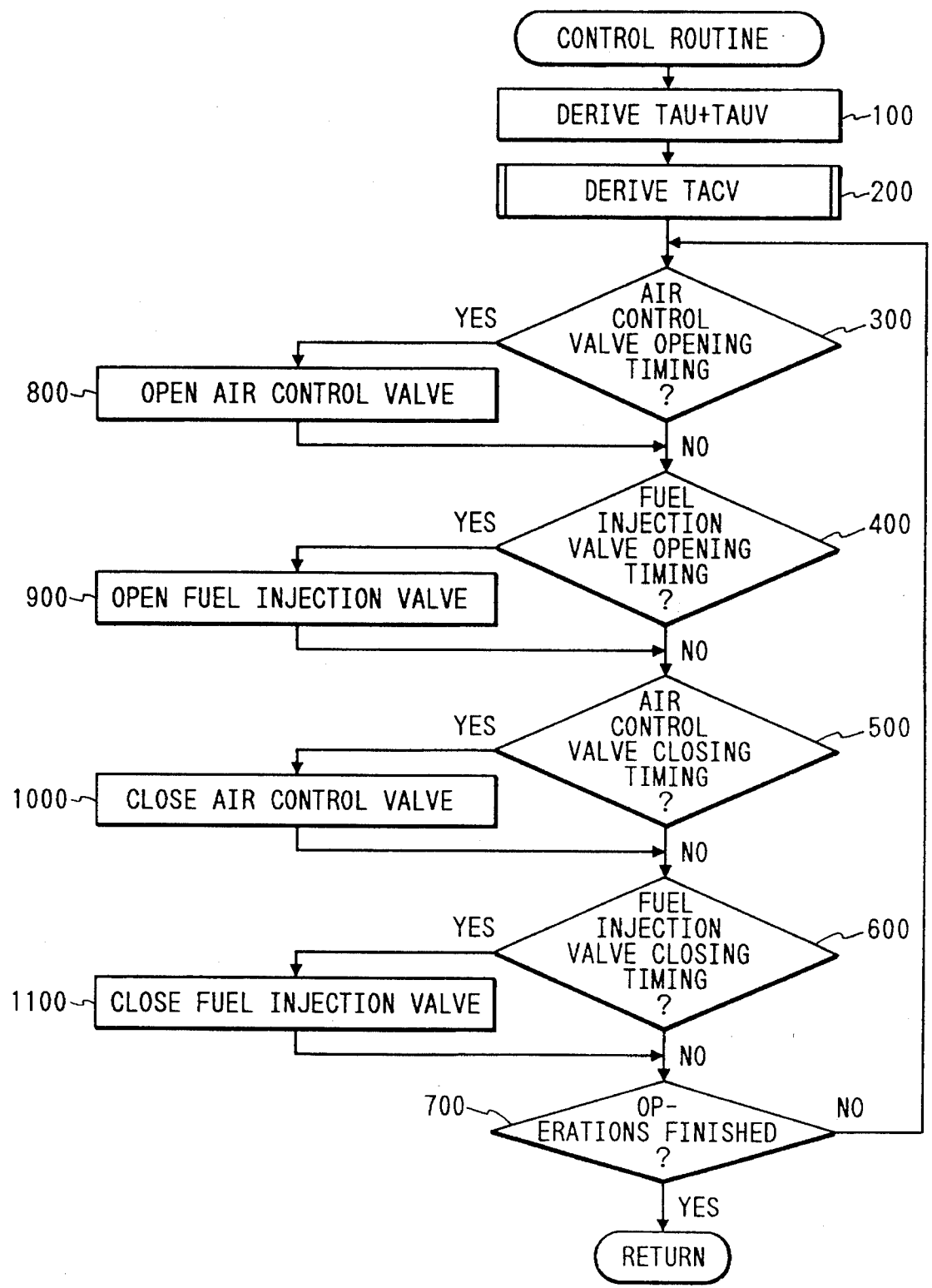
FIG. 7 is a flowchart showing a control routine to be executed by an ECU for controlling the operations of the fuel injection valves and the air control valve according to the first preferred embodiment.
Figure 8:
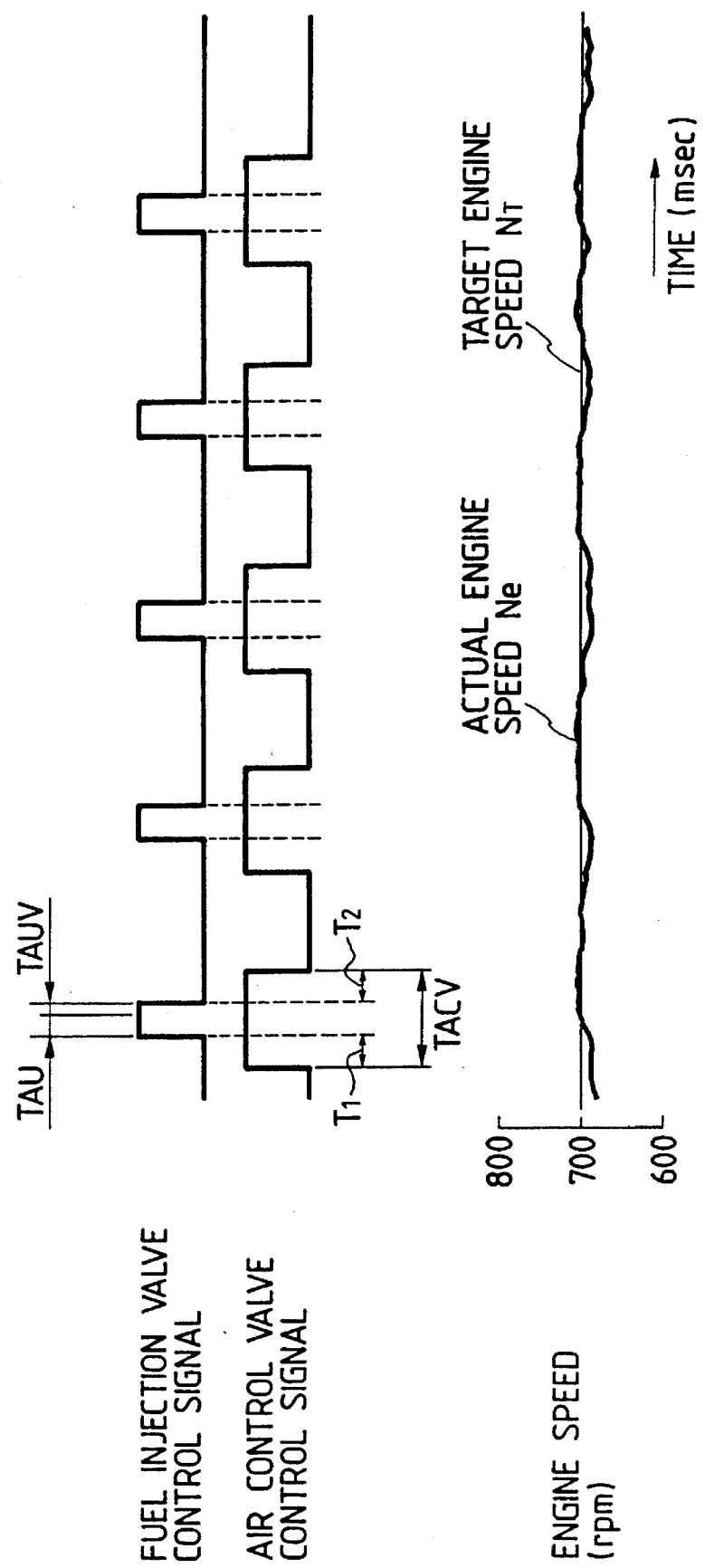
FIG. 8 is a time chart showing control signals for the fuel injection valves and the air control valve where actual engine speed is converged to a target engine speed.

FIG. 7 shows a flowchart of the control routine to be executed by the ECU 4 for controlling the operations of the fuel injection valves 26 and the air control valve 28, and FIG. 8 shows a time chart of control signals for the fuel injection valves 26 and the air control valve 28 under a condition where actual engine speed Ne is converted to a target engine speed $N_T$.

The control routine of FIG. 7 is executed per predetermined timing, such as, per 180° CA.

At a first step 100, the ECU 4 calculates a valve opening time (TAU+TAUV) of the fuel injection valve 26 which represents a fuel injection amount. Specifically, as is well known, ECU 4 derives a basic fuel injection amount TAUO based on an intake air quantity Q monitored by the airflow meter 31 and an engine speed Ne monitored by the rotation angular sensor 37. The basic fuel injection amount TAUO corresponds to an engine load Q/Ne. The ECU 4 further derives various correction coefficients based on signals from, such as, engine coolant temperature sensor 35, intake air temperature sensor 32 and oxygen sensor 36 to derive a valve opening time TAU by multiplying the basic fuel injection amount TAUO by these correction coefficients. The ECU 4 further derives a dead injection time TAUV using a stored map which defines the dead injection time TAUV in terms of a battery voltage, so as to finally derive the valve opening time (TAU+TAUV). The valve opening time (TAU+TAUV) represents the energization time of the fuel injection valve 26.

Figure 11:
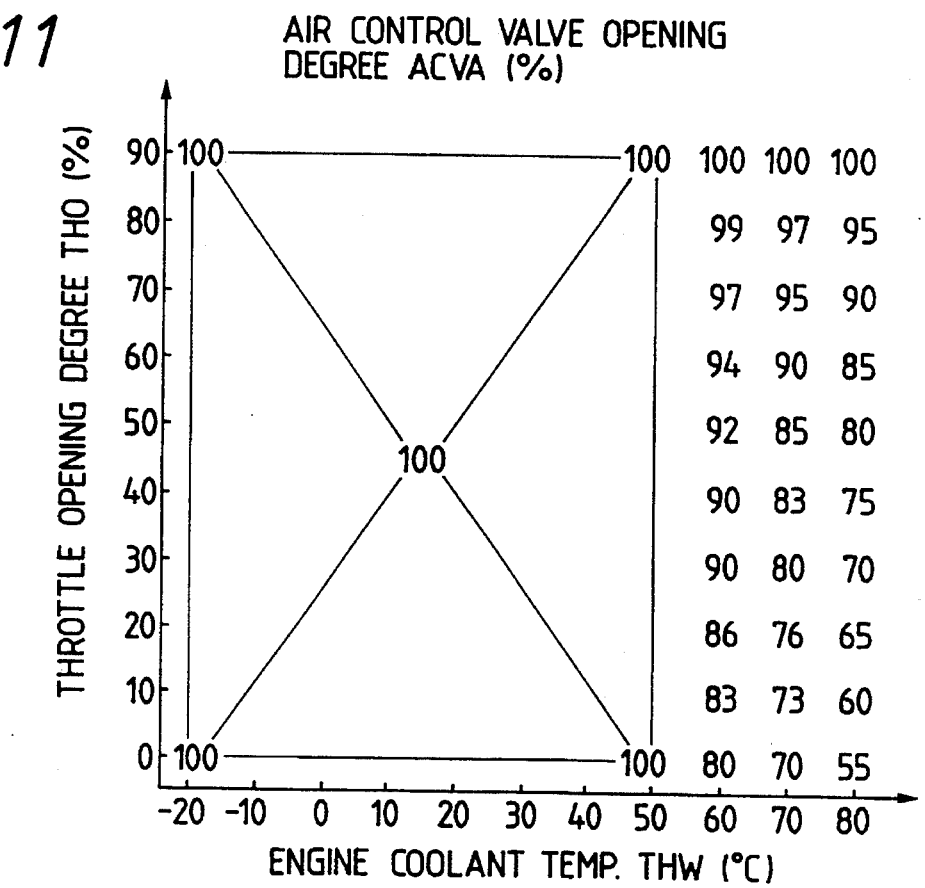
FIG. 11 is a map for deriving the degree of opening of the air control valve based on engine coolant temperature and the degree of opening of the throttle valve.

Subsequently, at a step 200, valve opening time TACV representing an energization time of the air control valve 28 (that is, a time period to apply a later-described duty signal to the coil 57) is derived by adding a rise point correction time T1 and a fall point correction T2 to the valve opening time (TAU+TAUV) and then by multiplying a sum of (TAU+TAUV), T1 and T2 by an inverse ratio of an opening degree ACVA of the air control valve 28 as shown in FIG. 11. The rise point correction time T1 represents how long a valve opening time of the air control valve 28 should be advanced relative to a valve opening timing of the fuel injection valve 26. Fall point correction time T2 represents how long a valve closing timing of the air control valve 28 should be retarded relative to a valve closing timing of the fuel injection valve 26. The details of the process at step 200 will be described later.

The routine now proceeds to step 300 which determines whether the valve opening timing of the air control valve 28 has been reached, i.e. whether a timing which is advanced by the aforementioned rise point correction time T1 relative to the present valve opening timing of the fuel injection valve 26 (for example, per 5° CA BTDC for each engine cylinder), has been reached. If the answer at step 300 is NO, then the routine proceeds to a step 400 which determines whether the valve opening timing of fuel injection valve 26 has been reached. As described above, since the valve opening timing of the fuel injection valve 26 is always delayed relative to that of the air control valve 28, step 400 produces a negative answer by determining that the valve opening timing of the fuel injection valve 26 has not been reached.

The routine now proceeds to step 500 which determines whether the valve closing timing of the air control valve 28 has been reached. Since the air control valve 28 has not even opened yet, step 500 produces a negative answer. At a subsequent step 600, it is determined whether the valve closing timing of the fuel injection valve 26 has been reached. Similarly, since the fuel injection valve 26 has not even opened yet, the step 600 produces a negative answer.

The routine now proceeds to step 700 which determines whether the valve opening and closing operations of the air control valve 28 and the fuel injection valve 26 have been finished or completed. Since the answer at step 700 at this time is NO, the routine returns to step 300 to repeat the process of steps 300 through 700.

On the other hand, if the answer at the step 300 is YES, i.e. the valve opening timing of the air control valve 28 has been reached, step 800 provides a high level (rise) in a control signal for the air control valve 28 as shown in FIG. 8 to open the air control valve 28. A duty ratio or factor of the control signal for the air control valve 28 is derived at later-described step 200A in FIG. 9. Thereafter, the process of steps 300 through 700 is repeated until the rise point correction time T1 has elapsed since the valve opening timing of the air control valve 28. When the rise point correction time T1 has elapsed, step 400 produces a positive answer, i.e. the valve opening timing of the fuel injection valve 26 has been reached. In response to this positive answer, step 900 produces a high level (rise) in a control signal for the fuel injection valve 26 as shown in FIG. 8 to open the fuel injection valve 26. Thereafter, when valve opening time (TAU+TAUV) has elapsed since the valve opening timing of the fuel injection valve 26, step 600 produces a positive answer, i.e. the valve closing timing of the fuel injection valve 26 has been reached. In response to this positive answer, step 1100 produces a low level (fall) in the control signal for the fuel injection valve 26 as shown in FIG. 8 to close the fuel injection valve 26. Thereafter, when the valve opening time TACV has elapsed since the valve opening timing of the air control valve 28, step 500 produces a positive answer, i.e. the valve closing timing of the air control valve 28 has been reached. In response to this positive answer, step 1000 produces a low level (fall) in the control signal for the air control valve 28 as shown in FIG. 8 to close the air control valve 28. Subsequently, the routine proceeds to step 700 which determines at this time that the opening and closing operations of the air control valve 28 and the fuel injection valve 26 have been completed to terminate this control routine.

It is to be appreciated that, although the fall point correction time T2 is set to a positive value in the foregoing description to close the air control valve 28 after the fuel injection valve 26 has been closed, the fall point correction time T2 may be set to a negative valve depending on the monitored engine operating conditions. As appreciated, in this case, air control valve 28 is closed at step 1000 in advance of the valve closing of fuel injection valve 26 performed at step 1100.

Figure 9:
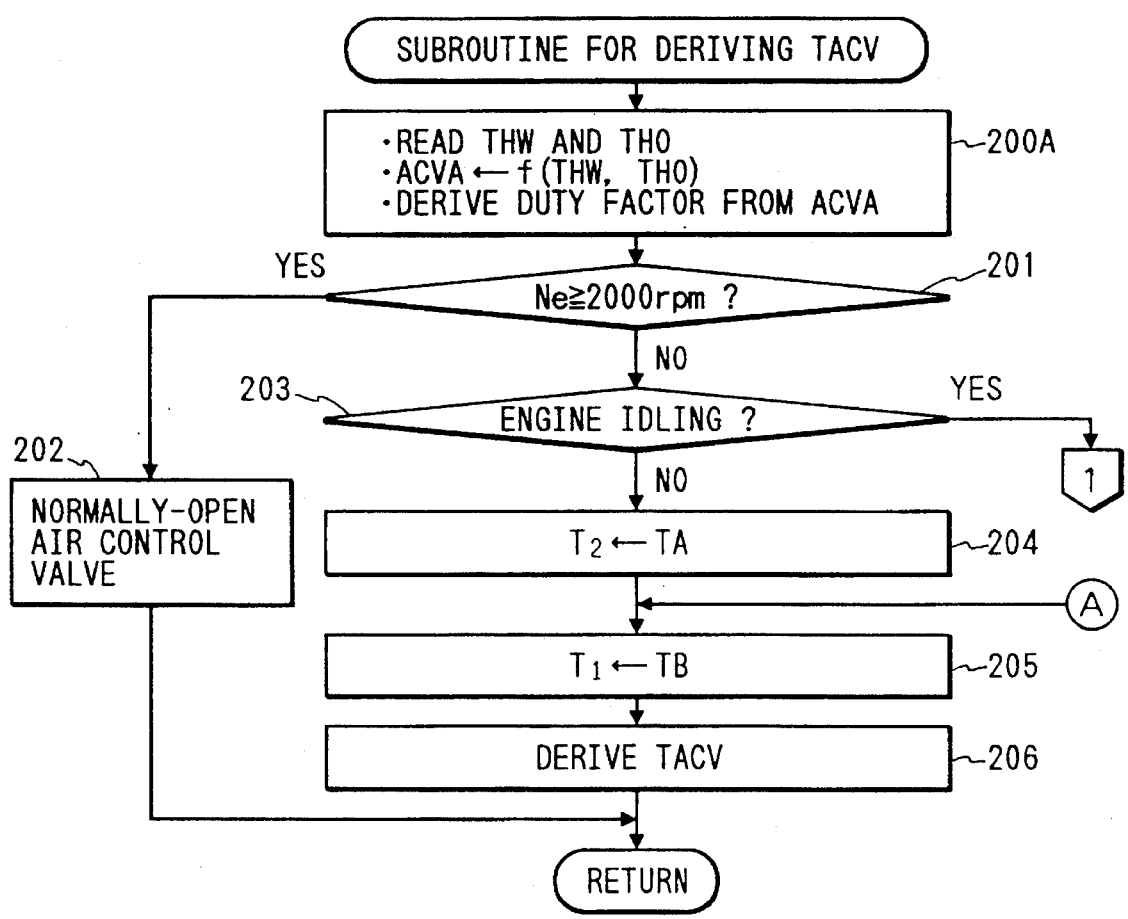
FIGS. 9 and 10 are flowcharts showing a subroutine of the control routine of FIG. 7, to be executed by the ECU to derive a valve opening time of the air control valve.
Figure 10:
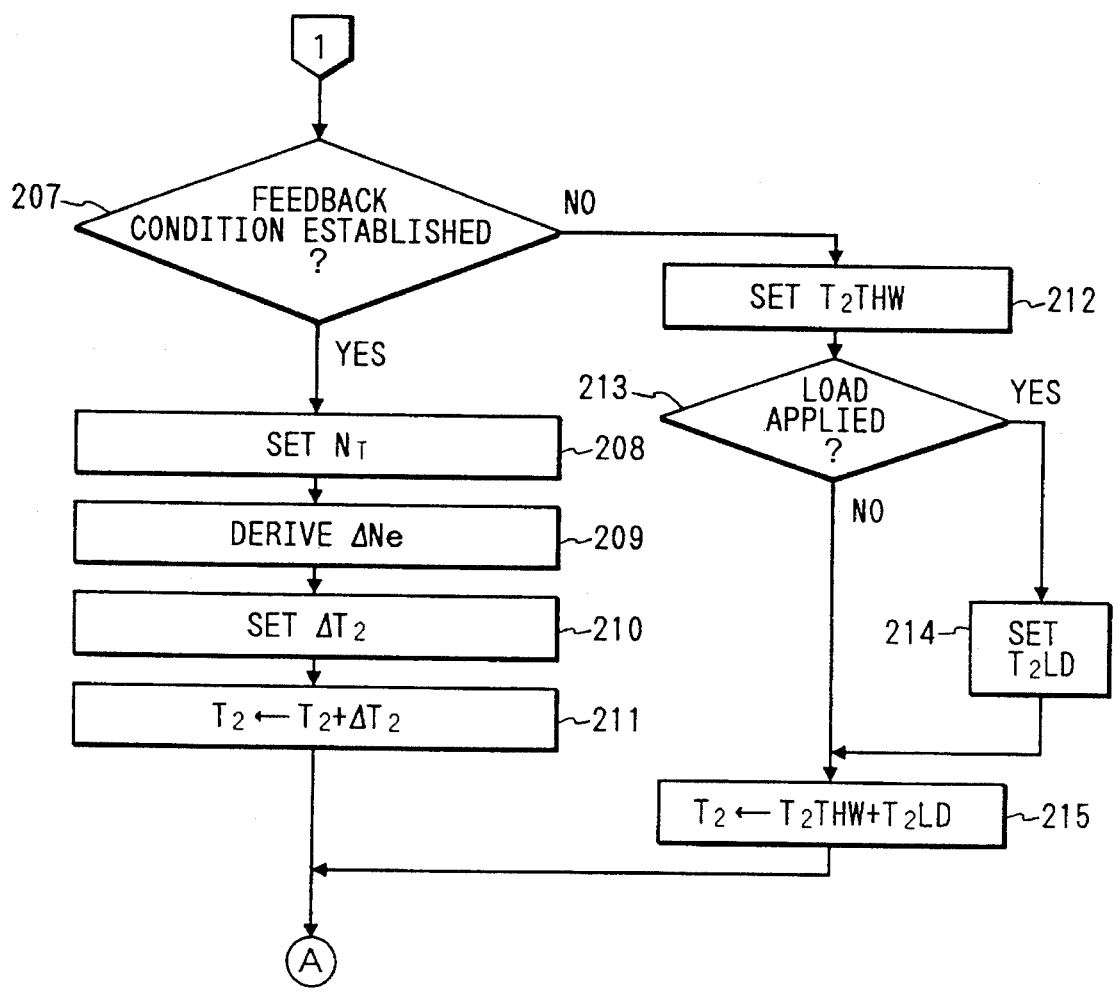
Figure 12:
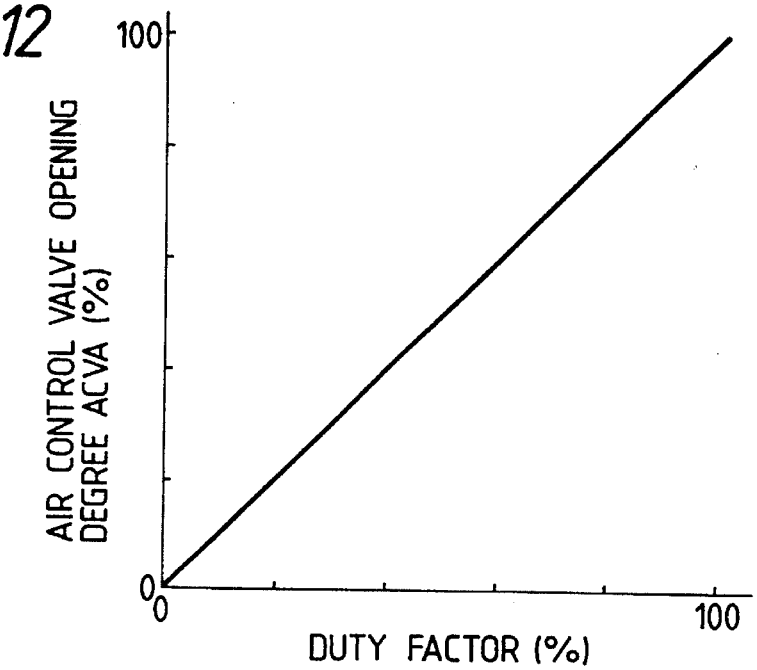
FIG. 12 is a map for deriving a signal level duty factor of a duty signal to control the opening and closing of the rotary-type valve member, based on the degree of opening of the air control valve.
Figure 13:
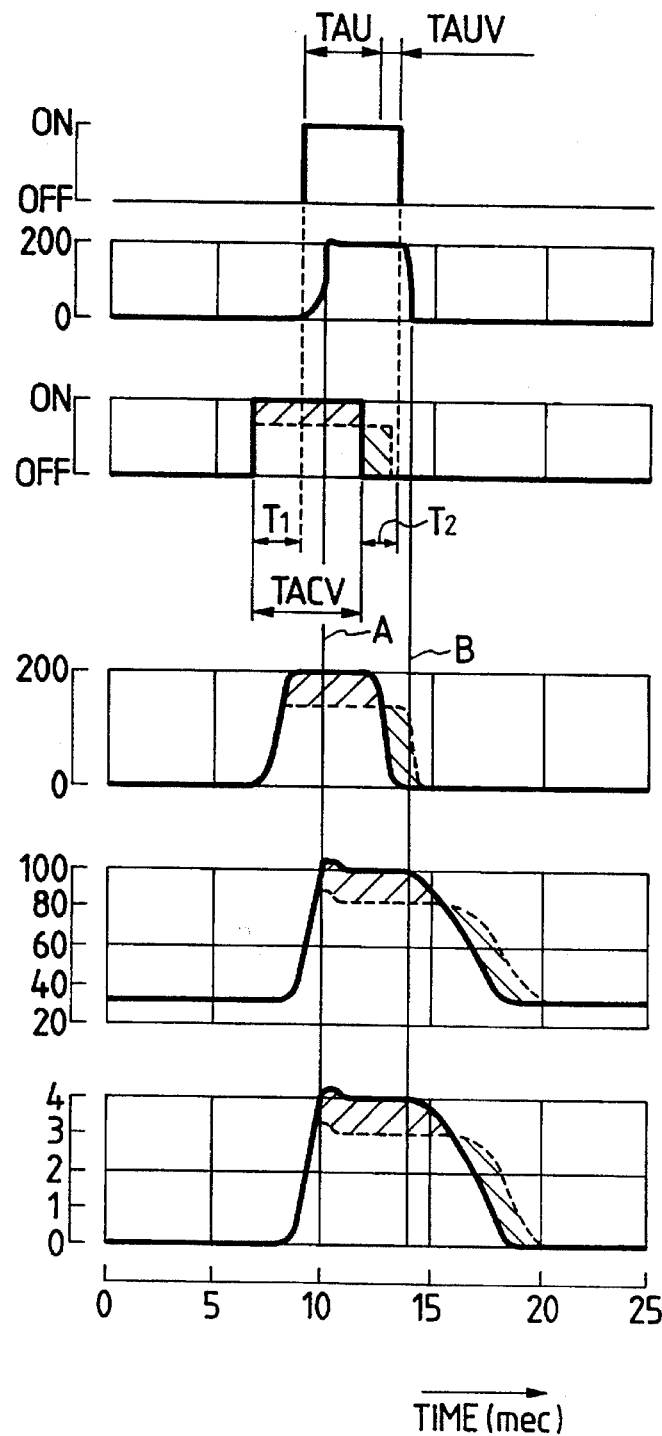
FIG. 13 is a time chart showing the synchronous relationship between the assist air and the fuel injection from the fuel injection valve.
Figure 14:
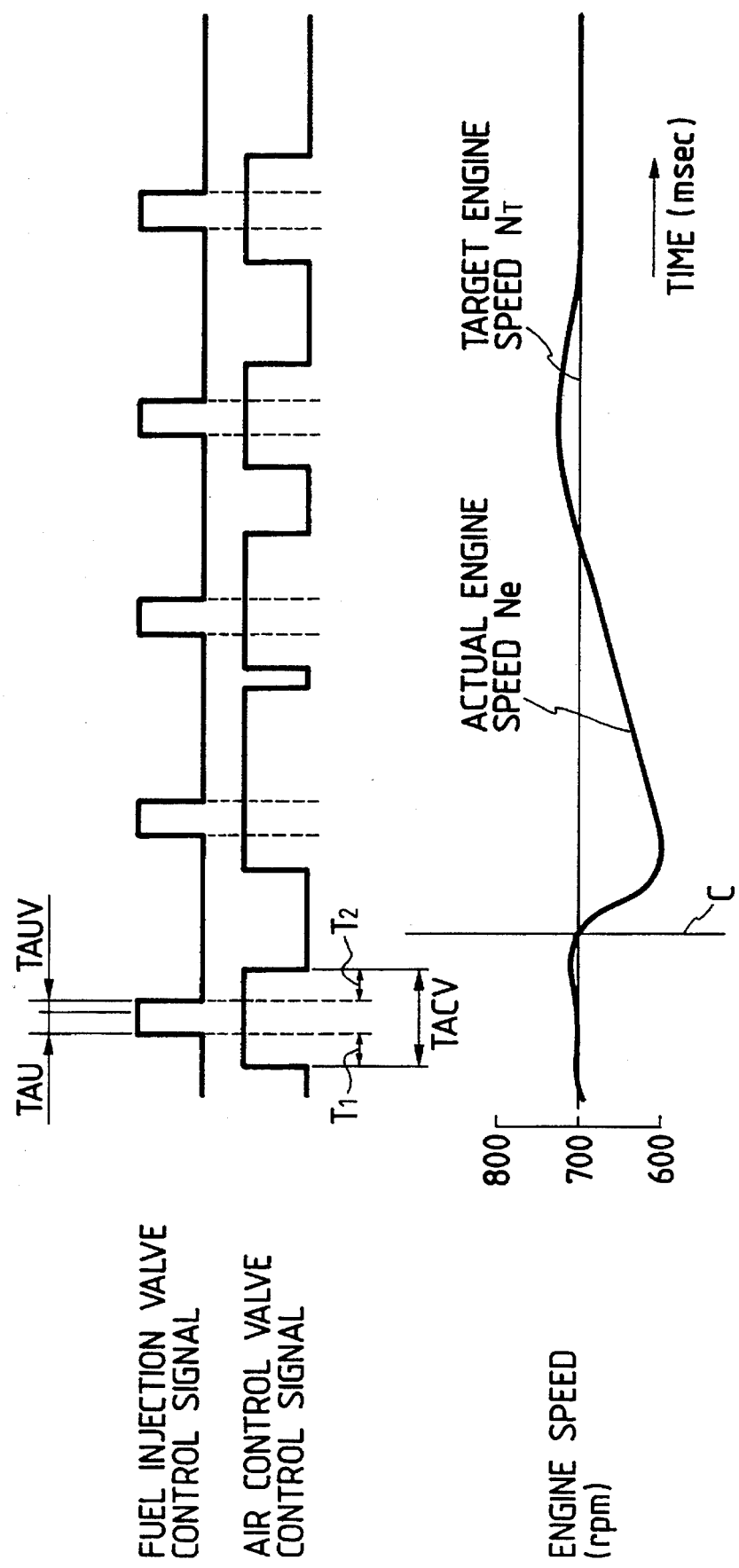
FIG. 14 is a time chart showing the control signals for the fuel injection valves and the air control valve when engine speed drops due to increase of an engine load.
Figure 15:
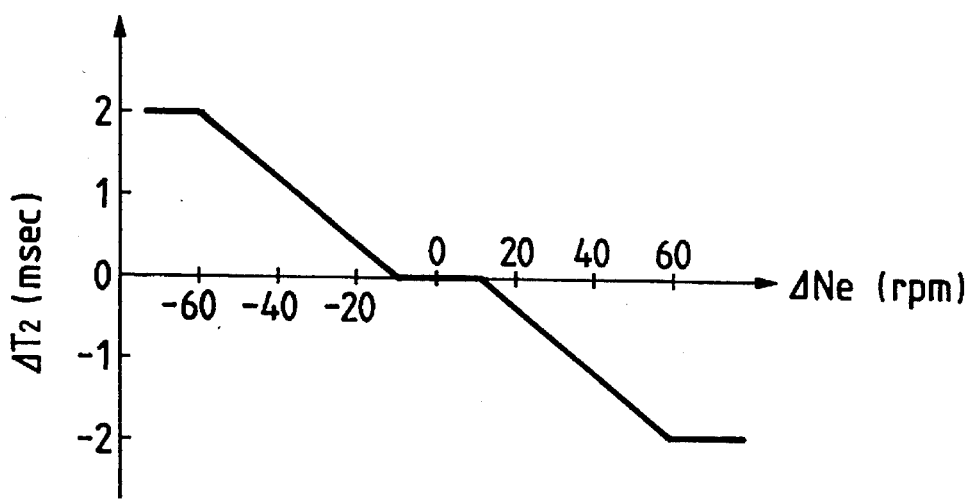
FIG. 15 is a map for deriving a correction value for fall point correction time based on the speed differential between monitored engine speed and a target engine speed.
Figure 16:
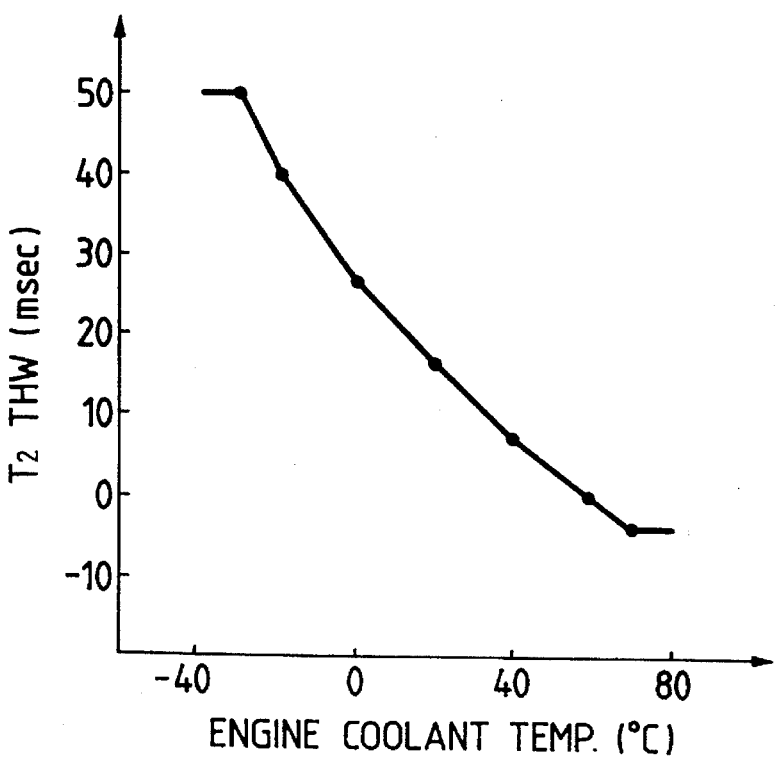
FIG. 16 is a map for deriving a correction value for fall point correction time based on engine coolant temperature, particularly during a fast idle of the engine.

FIGS. 9 and 10 show flowcharts of a subroutine corresponding to step 200 in FIG. 7 for deriving the valve opening time TACV of the air control valve 28. FIG. 11 is a map for deriving an opening degree ACVA of the air control valve 28 based on engine coolant temperature THW and the opening degree THO of the throttle valve 14. FIG. 12 is a map for deriving a duty factor (signal level) of a duty signal to control the opening and closing of rotary-type valve member 53, based on the opening degree ACVA of air control valve 28, as derived from the map of FIG. 11. FIG. 13 is a time chart showing assist air supplied synchronously with fuel injected from fuel injection valve 26. FIG. 14 is a time chart showing a relationship between the control signals for the fuel injection valve 26 and the air control valve 28 when engine speed Ne drops due to increased engine load. FIG. 15 is a map for setting correction value ΔT2 for fall point correction time T2 based on the speed differential ΔNe between monitored engine speed Ne and target engine speed $N_T$. FIG. 16 is a map for setting a correction value $T2_{THW}$ for the fall point correction time T2 based on the monitored engine coolant temperature THW, particularly during the fast idle of the engine.

As shown in FIGS. 9 and 10, at step 200A, ECU 4 first determines engine coolant temperature THW and throttle opening degree THO. Subsequently, ECU 4 derives the opening degree ACVA of air control valve 28 based on the engine coolant temperature THW and throttle opening degree THO, using the map of FIG. 11. The ECU 4 further derives a duty factor of the duty signal applied to the coil 57 of the air control valve 28 based on the derived opening degree ACVA of air control valve 28, using the map of FIG. 12.

As shown in FIG. 11, when the engine coolant temperature THW exceeds 50° C., the opening degree ACVA of air control valve 28 is proportional to the throttle opening degree THO and inversely proportional to the engine coolant temperature THW. On the other hand, as shown in FIG. 12, the duty factor (i.e. the level of the control signal) is proportional to the opening degree ACVA of air control valve 28. As appreciated from a comparison of FIGS. 4(A) and 11, the electrical limitation of the opening degree ACVA of air control valve 28 performed by ECU 4 based on the engine coolant temperature THW and the throttle opening degree THO is greater than the mechanical limitation accomplished by means of linkage 65, bimetal 61, guard member 59 and the like. Specifically, the electrical limitation provides a smaller opening of air control valve 28 than the mechanical limitation.

Referring back to FIG. 9, the routine now proceeds to step 201 which decides whether the engine speed Ne monitored by the rotation angle sensor 37 is equal to or greater than 2,000 rpm. If the answer is YES, step 202 controls the air control valve 28 with the duty factor derived at step 200A and terminates this subroutine without deriving the valve opening time TACV of air control valve 28. Accordingly, if the engine speed Ne is equal to or greater than 2,000 rpm, air control valve 28 is kept open. As appreciated, since the valve opening time TACV is not derived at the step 200 when the step 202 is executed, steps 300 and 500 respectively produce negative answers, and steps 400, 900, 600 and 1100 are executed based on the preset valve opening timing of the fuel injection valve 26 and valve opening time (TAU+TAUV) derived at step 100, and step 700 produces a positive answer after step 1100 has been executed.

Step 202 keeps air control valve 28 open because, although the fuel injection valve 26 and the air control valve 28 are both controlled synchronously with engine rotation through steps 300 to 1100 in FIG. 7, air control valve 28 can not respond quickly enough to follow-up the high engine speed, resulting in a delay of the opening and closing thereof. Further, since a large amount of the intake air is introduced into the combustion chamber 8 depending on the opening degree of the throttle valve 14 to control the engine speed when step 202 is executed, it is not necessary to adjust the supply of assist air through the assist air passage 27 by controlling the opening and closing operation of the air control valve 28, as opposed to a later-described case of engine idling where throttle valve 14 is fully closed.

Since assist air is continuously introduced into area near fuel injecting hole 43 via air injecting holes 42, atomization of the fuel injected through fuel injecting hole 43 is highly facilitated.

On the other hand, if the answer at step 201 is NO, step 203 determines whether the engine 2 is idling based on the ON/OFF state of idle switch 34. When the answer at step 203 is NO, i.e. the engine is not idling at a speed less than 2,000 rpm, step 204 sets negative value TA as the fall point correction time T2. Subsequently, at a step 205, a preset positive value TB is set as the rise point correction time T1, and at step 206, the valve opening time TACV is derived using the following equation:

$$TACV=\{T1+(TAU+TAUV)+T2\}\times(100/ACVA)$$

After the execution of step 206, this subroutine is terminated to proceed to step 300 in FIG. 7.

Accordingly, when air control valve 28 and fuel injection valve 26 are opened at steps 800 and 900, respectively, the rise point (leading edge) of the control signal for air control valve 28 is advanced relative to that for the fuel injection valve 26 by fixed rise point correction time T1 as shown in FIG. 13. Similarly, when the air control valve 28 and the fuel injection valve 36 are closed at steps 1000 and 1100, respectively, the fall point (trailing edge) of the control signal for the air control valve 28 is advanced relative to that for the fuel injection valve 26 by fixed fall point correction time T2.

In consideration of the response characteristic of the air control valve 28, the inertia of the assist air and so on, the rise point correction time T1 is set to maximize pressure on the upstream side of air injecting holes 42 by means of an increased open area of the air control valve 28 at a time A in FIG. 13 when fuel injection is actually started. On the other hand, fall point correction time T2 is set to maximize pressure on the upstream side of the air injecting holes 42 until time B in FIG. 13 when fuel injection is finished, and thereafter to rapidly lower the pressure on the upstream side thereof.

Accordingly, during the non-idle or off-idle running of the engine 2 at a speed less than 2,000 rpm, assist air is mainly supplied during the actual fuel injection to facilitate atomization of the injected fuel when the engine speed equal to or greater than 2,000 rpm.

In each of the time charts of FIG. 13, a solid line represents the case where the opening degree ACVA of the air control valve 28 is 100%, and a broken line represents the case where the opening degree ACVA is about 70%. As seen from FIG. 13, the opening degree of rotary-type valve member 53 of air control valve 28 changes depending on the duty factor of the control signal applied to coil 57 of air control valve 28. As described above, the duty factor (i.e. the level of the control signal for the air control valve 28) is proportional to the opening degree ACVA of air control valve 28 as shown in FIG. 12. Further, the opening degree ACVA is determined from engine coolant temperature THW and throttle opening degree THO as shown in FIG. 11 to limit the opening of the control valve 28 to a smaller value than the mechanical limitation shown in FIG. 4(A). Accordingly, assuming that air control valve 28 is normally opened and closed synchronously with the injection of fuel through fuel injection valve 26, when the opening degree of the air control valve 28 is mechanically limited due to the tip portion 61a of bimetal 61 as shown in, FIG. 5(B), the electrical limitation performed by ECU 4 prevents further opening rotation of valve member 53 before the guard member 59 collides with the tip portion 61a of bimetal 61 so that the mechanical limitation does not work in this case.

As described above, when the opening degree ACVA of air control valve 28 is reduced, the duty factor of the control signal for air control valve 28 is proportionally reduced as shown in FIG. 12. On the other hand, as described above, the valve opening time TACV of the air control valve 28 is inversely proportional to the opening degree ACVA and thus the duty factor. Accordingly, as seen from the relationship shown in FIG. 13, between the solid lines where the opening degree ACVA is 100% and the broken lines where the opening degree ACVA is about 70%, the valve opening time TACV becomes longer corresponding to the decrease of the duty factor. In other words, in each of the foregoing items in FIG. 13, areas defined by the dashed lines drawn in mutually crossing directions are equal to each other. As a result, the total sectional open area of air control valve 28, total upstream pressure of air injecting holes 42 and total amount of assist air, when air control valve 28 is opened, are all constant, irrespective of whether the opening degree ACVA is 100% or 70%.

Accordingly, even when the opening of air control valve 28 is electrically limited in response to the engine coolant temperature THW being above 50° C. as shown in FIG. 11, the total amount of assist air is equal to that supplied when there is not limitation.

Referring back to FIG. 9, when step 203 produces a positive answer, i.e. the engine is idling, to a step 207 in FIG. 10 determines whether feedback control of idling engine speed is established. As is well known, this condition occurs when feedback control of the idling engine speed is necessary, and is thus satisfied when, for example, engine coolant temperature THW is no less than 80° C., or vehicle speed is less than 3 km/h. The step 207 produces a positive answer when the feedback control condition for the engine idling is established, based on the engine coolant temperature THW and the vehicle speed, as monitored by the appropriate sensors.

At subsequent step 208, target idling engine speed NT is set based on operating conditions of equipped electrical loads (i.e. air conditioner, etc.) and the position of 1 gear shift lever such as an N-range (neutral range) and a D-range (drive range) in case of an automatic transmission vehicle. The target engine speed NT may be set to, for example, 700 rpm. Thereafter, step 209 derives speed differential ΔNe between the engine speed Ne monitored by the rotation angle sensor 37 and the target engine speed $N_T$ based on the following equation:

$$\Delta Ne = Ne - N_T$$

Subsequently, at step 210, a correction value ΔT2 is set based on the derived speed differential ΔNe, using a map as shown in FIG. 15. This map is prestored in ROM 4b and defines correction value ΔT2 in terms of speed differential ΔNe. A subsequent step 211 derives a new value of fall point correction time T2 by adding correction value ΔT2 derived at the step 210 to a last or previous value of the fall point correction time T2, i.e. using the following equation:

$$T2 \leftarrow T2 + \Delta T2$$

Step 205 sets rise point correction time T1 to preset positive value TB, just as when the engine off-idling is at a speed less than 2,000 rpm. Thereafter, step 206 derives the valve opening time TACV of air control valve 28 in the same manner as described above at step 206, i.e. by using the following equation:

$$TACV = \{T1 + (TAU + TAUV) + T2\} \times (100/ACVA)$$

After the step 206, this subroutine is terminated to proceed to step 300 in FIG. 7.

Accordingly, when air control valve 28 and fuel injection valve 26 are closed at steps 1000 and 1100, respectively, and fall point correction time T2 is set to a positive value at step 211, the fall point in the control signal for air control valve 28 is delayed relative to that for fuel injection valve 26 by fall point correction time T2, as shown in FIG. 8. as appreciated, the correction of fall point correction time T2 reduces the speed differential ΔNe between monitored engine speed Ne and target engine speed NT so that actual engine speed Ne converges to the target engine speed $N_T$, such as, 700 rpm.

For example, the load applied to the power steering pump is increased and the engine speed Ne drops sharply as indicated in FIG. 14 at a time C, the speed differential ΔNe derived in step 209 is negative, so step 210 sets correction value ΔT2 as a positive value as shown in FIG. 15. Accordingly, the fall point correction time T2 is increased at step 211 to prolong the valve opening time TACV. As a result, the assist air supply is increased to restore the engine speed Ne to the target engine speed $N_T$ of 700 rpm. On the other hand, when the air conditioner is activated, step 208 sets the target engine speed $N_T$ to, for example, 900 rpm. The actual engine speed Ne is increased to the target engine speed NT through steps 209 to 211 in the same manner as described above.

The fall point correction time T2 may have a positive or negative value. When, for example, the load applied to the power steering pump is decreased to increase the engine speed Ne, the fall point correction time T2 may be negative to shorten the valve opening time TACV of the air control valve 28 so that the actual engine speed Ne converges to the target engine speed $N_T$.

As appreciated from the foregoing description, when the engine is idling with the feedback control condition satisfied, the valve opening time TACV of the air control valve 28 is suitably corrected by the fall point correction time T2 to converge the engine speed Ne to the target engine speed $N_T$ which varies depending on the operating conditions of the equipped current consumers and the gear shift lever position. Accordingly, the assist air works not only to facilitate the atomization of the injected fuel, but also to control the idling speed.

Referring back to step 207, when step 207 produces a negative answer, i.e. the feedback control condition is not established, step 212 sets a correction value $T2_{THW}$ based on the monitored engine coolant temperature THW, using a map as shown in FIG. 16. This map is prestored in ROM 4b and defines correction value $T2_{THW}$ in terms of the engine coolant temperature THW. Subsequently, step 213 checks whether any preselected loads for lowering engine speed Ne are applied, i.e. whether current consumers such as the air conditioner are activated or not, or whether the gear shift lever position is in the D-range in a vehicle with an automatic transmission. If the answer at step 213 is YES, then the routine proceeds to step 214 where correction value $T2_{LD}$ is set depending on the applied loads as checked at step 213. Thereafter, at step 215, the fall point correction time $T_2$ is derived based on the correction values $T2_{THW}$ and $T2_{LD}$, using the following equation:

$$T2 \leftarrow T2_{THW} + T2_{LD}$$

Now, the routine proceeds to step 205 which sets the rise point correction time T1 in the same manner as described before, and then to step 206 which derives the valve opening time TACV of air control valve 28 in the same manner as described before.

When step 213 produces a negative answer, i.e. no preselected load is applied, then step 215 sets fall point correction time T2 to the correction value $T2_{THW}$ derived at step 212.

After step 206, this subroutine is terminated to proceed to steps 300 through 1100 as described before.

As shown in FIG. 16, correction value $T2_{THW}$ is set to a larger positive value as the engine coolant temperature THW decreases, and to a negative value when the engine coolant temperature THW is higher than about 70° C. (when the engine is warmed up). As a result, when air control valve 28 and fuel injection valve 26 are closed at the steps 1000 and 1100 in FIG. 7, the fall point in the control signal for air control valve 28 is retarded by fall point correction time T2 at a low engine temperature as shown in FIG. 8 so that engine speed Ne is increased by increasing the supply of assist air for fast idling. On the other hand, after the engine is warmed up, the fall point in the control signal for air control valve 28 is advanced by fall point correction time T2 as shown in FIG. 13 so that engine speed is decreased by decreasing the supply of assist air to finish the fast idle operation of the engine.

On the other hand, correction value T2LD is set at step 214 to a positive value which depends on the loads. Since correction value $T2_{LD}$ is positive, the valve opening time TACV is prolonged when correction value $T2_{LD}$ is added. By increasing the supply of assist air, reduction in the idling engine speed Ne is prevented, which would be otherwise caused by, for example, a load applied from a torque converter when the transmission is shifted to the D-range, or the idling speed Ne is increased to ensure cooling power when the air conditioner is activated.

As appreciated from the foregoing description, when the feedback control condition is not established during the engine idling, the valve opening time TACV is increased or decreased by fall point correction time T2 to control the idling engine speed depending on the engine coolant temperature. In addition, the valve opening time TACV is increased by fall point correction time T2 (when at least one of the preselected loads is applied to the engine, to control the idling engine speed depending on the load applied to the engine. As a result, the assist air under this engine idling condition not only facilitates atomization of the injected fuel, but also optimizes idling engine speed where the feedback control condition is established.

As can be further appreciated, the opening degree of air control valve 28 is controlled by the duty factor derived at step 200A during engine idling, as in case of engine off-idling, irrespective of whether or not the feedback control condition is satisfied. Accordingly, as in case of the engine off-idling at a speed less than 2,000 rpm, the opening degree of air control valve 28 changes depending on the duty factor of the control signal derived at step 200A in FIG. 9, and the electrical limitation performed by ECU 4 prevents further opening rotation of the valve member 53 of air control valve 28 before the guard member 59 collides with the tip portion 61a of the bimetal 61 so that the mechanical limitation does not work normally. Further, the total sectional open area of air control valve 28, the total upstream pressure of the air injecting holes 42 and the total assist air amount, when air control valve 28 opened, are constant, irrespective of the opening degree ACVA of air control valve 28.

In the first preferred embodiment as described above, when the engine coolant temperature exceeds 50° C., particularly during engine idling, the opening degree of the air control valve 28 is limited to a smaller value inversely proportional to the engine coolant temperature both in the mechanical and electrical embodiments. Accordingly, even when the engine idles with air control valve 28 continuously open due to failure, since the opening degree of air control valve 28 is limited as the engine coolant temperature exceeds 50° C., excessive increase in the idling engine speed is prevented by suppressing the supply of assist air, i.e. the intake air quantity Q, and thus by reducing the fuel injection amount. When electrical control of the opening of air control valve 28 fails, the mechanical control becomes effective to prevent overrunning of the engine 2.

Further, in the first preferred embodiment, when the engine coolant temperature exceeds 50° C., the opening of air control valve 28 is not only inversely proportional to the engine coolant temperature but also proportional to the opening degree of the throttle valve 14. Accordingly, when the opening degree of throttle valve 14 increases to reduce the pressure differential between the pressure in the intake port 11 and the atmospheric pressure when the engine coolant temperature is over 50° C., the opening degree of air control valve 28 is proportional to the increasing opening degree of the throttle valve 14 to ensure a sufficient amount of assist air, and ensure effective atomization of the injected fuel.

Further, in the first preferred embodiment, the electrical control of air control valve 28 provides an opening which is smaller than that provided by mechanical control performed by the linkage 65, the bimetal 61, the guard member 59 and the like. Accordingly, during normal operation, the electrical limitation of the opening of air control valve 28 becomes effective before the mechanical limitation becomes effective, that is, before the abutment of the guard member 59 with the tip portion 61a of the bimetal 61. This effectively prevents wear or damage of the members of the mechanical control mechanism to ensure the durability of those members and enhance reliability.

Further, in the first preferred embodiment, the valve opening time TACV of the air control valve 28 is inversely proportional to the opening degree ACVA of air control valve 28. Accordingly, during normal operation where the opening and closing of air control valve 28 is synchronous with the fuel injection, the total amount of the assist air supplied when the air control valve 28 is opened is equal to that supplied when the control of the opening degree of the air control valve 28 is not executed, to ensure effective atomization of the injected fuel. This further ensures a required idling engine speed even when the opening of air control valve 28 is limited.

Instead of the opening degree of the throttle valve 14, other parameters, such as intake air quantity, intake vacuum pressure or fuel injection amount, indicative of engine load may be used to control the opening of air control valve 28.

Further, instead of linkage 65 and bimetal 61, the position of the tip portion of a mechanical member having a shape similar to that of the bimetal 61 may be controlled by ECU 4 or another microcomputer, electronic circuit or the like based on engine coolant temperature and throttle valve opening degree. When such positional control is performed by a microcomputer, electronic circuit or the like other than ECU 4, even if air control valve 28 is continuously opened due to failure of ECU 4, the opening of air control valve 28 is reliably controlled to prevent overrunning of the engine 2 during idling.

Further, instead of limiting the opening degree of air control valve 28, the opening degree of air introducing section 27a of the assist air passage 27 may be controlled independent of the opening and closing operation of air control valve 28. Specifically, a variable or adjustable throttling may be provided in the air introducing section 27a at a position downstream of the air outlet 52 of air control valve 28 or at another position, and the degree of the adjustable throttling may be changed by means of a bimetal connected to throttle valve 14 via a linkage, or may be controlled by ECU 4 or another control means based on monitored engine load and engine coolant temperature.

Further, instead of deriving the duty factor of the control signal to be applied to the coil 57 based on engine coolant temperature THW and throttle opening degree THO, the duty factor may be derived by directly detecting the position of the distal end of tip portion 61a of bimetal 61. As appreciated, also in this modification, the duty factor is determined to limit the opening degree of air control valve 28 to a value smaller than that provided by the position of the distal end of tip portion 61a.

Now, a second preferred embodiment of the present invention will be described hereinbelow.

In the second preferred embodiment, the opening degree of an air control valve is determined by selecting a combination of on-off controls of exciting coils 57(1) and 57(2) depending on the operating conditions of the engine 2, such as, engine thermal condition and engine speed, as opposed to the foregoing first preferred embodiment where the opening degree of air control valve 28 is determined by the duty factor of the control signal. In this preferred embodiment, the magnetomotive force of the coil 57(2) is set greater than that of the coil 57(1).

Figure 17:
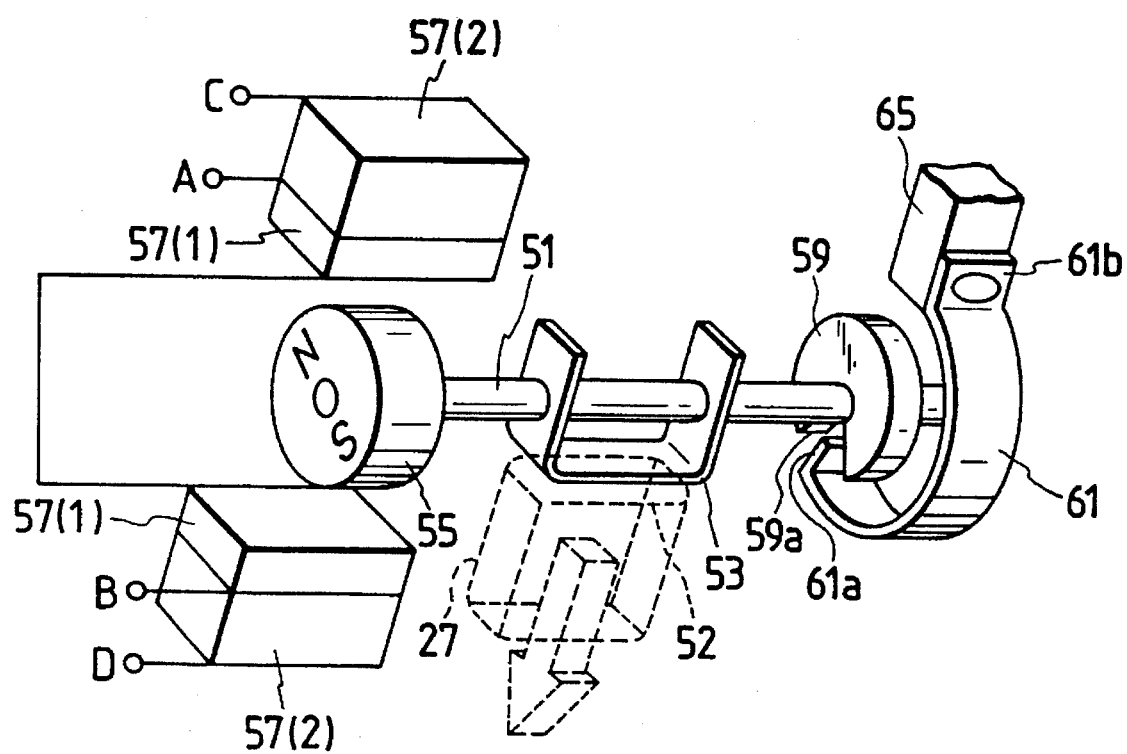
FIG. 17 is a schematic perspective view showing the basic structure of an air control valve to be used in a second preferred embodiment of the present invention.

FIG. 17 is a schematic perspective view showing the structure of an air control valve 28 to be used in this preferred embodiment. In FIG. 17, the reference numerals or marks represent the same or corresponding elements in FIG. 3.

Figure 18A:
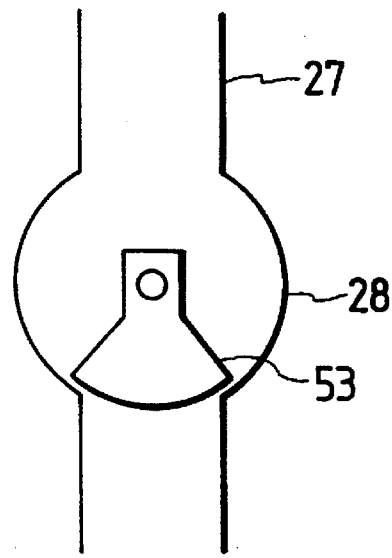
FIGS. 18(A), 18(B), 18(C) and 18(D) are diagrams, respectively, explaining the operation of the air control valve shown in FIG. 17.
Figure 18B:
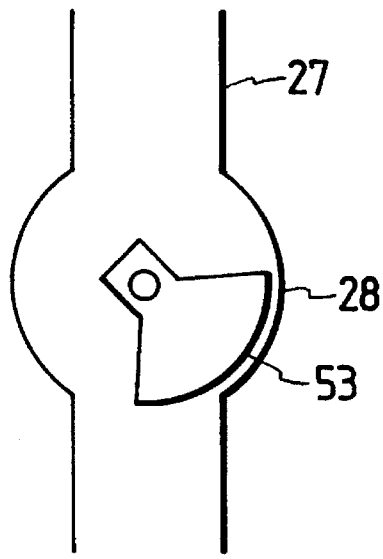
Figure 18C:
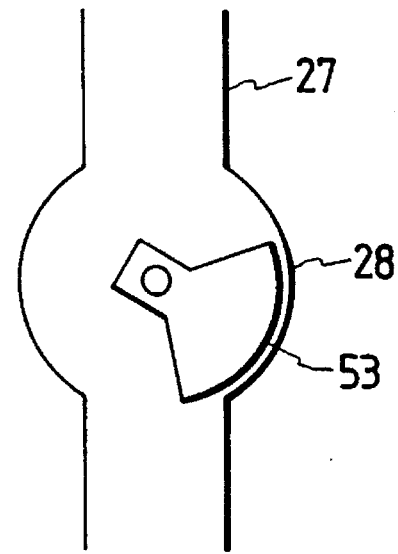
Figure 18D:
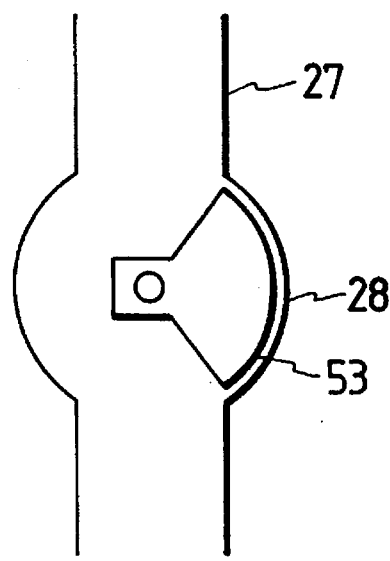

In FIG. 17, when the current flows between terminals A and b to excite coil 57(1), air control valve 28 is opened about 40% as shown in FIG. 18(B). On the other hand, when the current flows between terminals C and D to excite coil 57(2), air control valve 28 is opened about 60% as shown in FIG. 18(C). Further, when current flows between terminals A and B and between terminals C and D in the same direction to excite coils 57(1) and 57(2), the air control valve 28 is fully opened as shown in FIG. 18(D). On the other hand, when none of the coils 57(1) and 57(2) are energized, air control valve 28 is fully closed as shown in FIG. 18(A).

Figure 19:
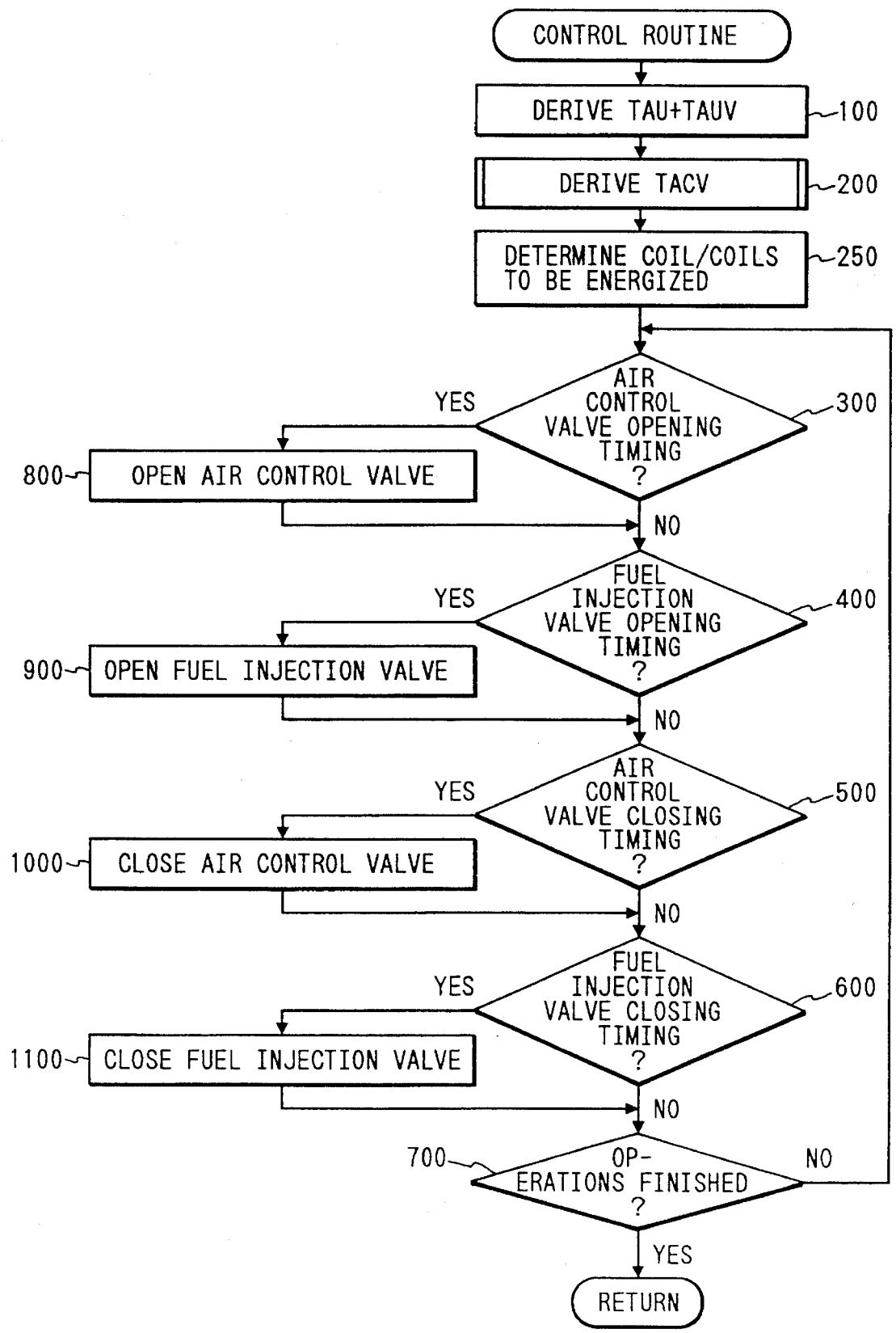
FIG. 19 is a flowchart showing a control routine to be executed by the ECU for controlling the operations of the fuel injection valves and the air control valve according to the second preferred embodiment.

FIG. 19 shows a flowchart of a control routine executed by ECU 4 for controlling the opening of air control valve 28 according to the second preferred embodiment. In the flowchart of FIG. 19, step 250 is added to the flowchart of FIG. 7. Further, as described above, the on-off control is used for controlling the opening degree of air control valve 28 in the second preferred embodiment, as opposed to the first preferred embodiment which uses duty-factor control. The second preferred embodiment will be described hereinbelow, mainly referring to differences from the first preferred embodiment.

In FIG. 19, first step 100 derives the valve opening time (TAU+TAUV) of the fuel injection valve 26 as in the first preferred embodiment. Subsequently, step 200 derives valve opening time TACV of air control valve 28. Although the duty factor is derived at step 200 in FIG. 7 as seen from step 200A in FIG. 9, step 200 in FIG. 19 does not derive the duty factor since on-off control is utilized as described above. Thereafter, the routine proceeds to step 250 which determines the coil or coils to be energized, using a map of FIG. 20, so as to provide an opening degree of the air control valve 28 depending on the operating condition of engine 2. The map of FIG. 20 is prestored in ROM 4b and defines the coil or coils to be energized in terms of engine coolant temperature and engine speed.

Figure 20:
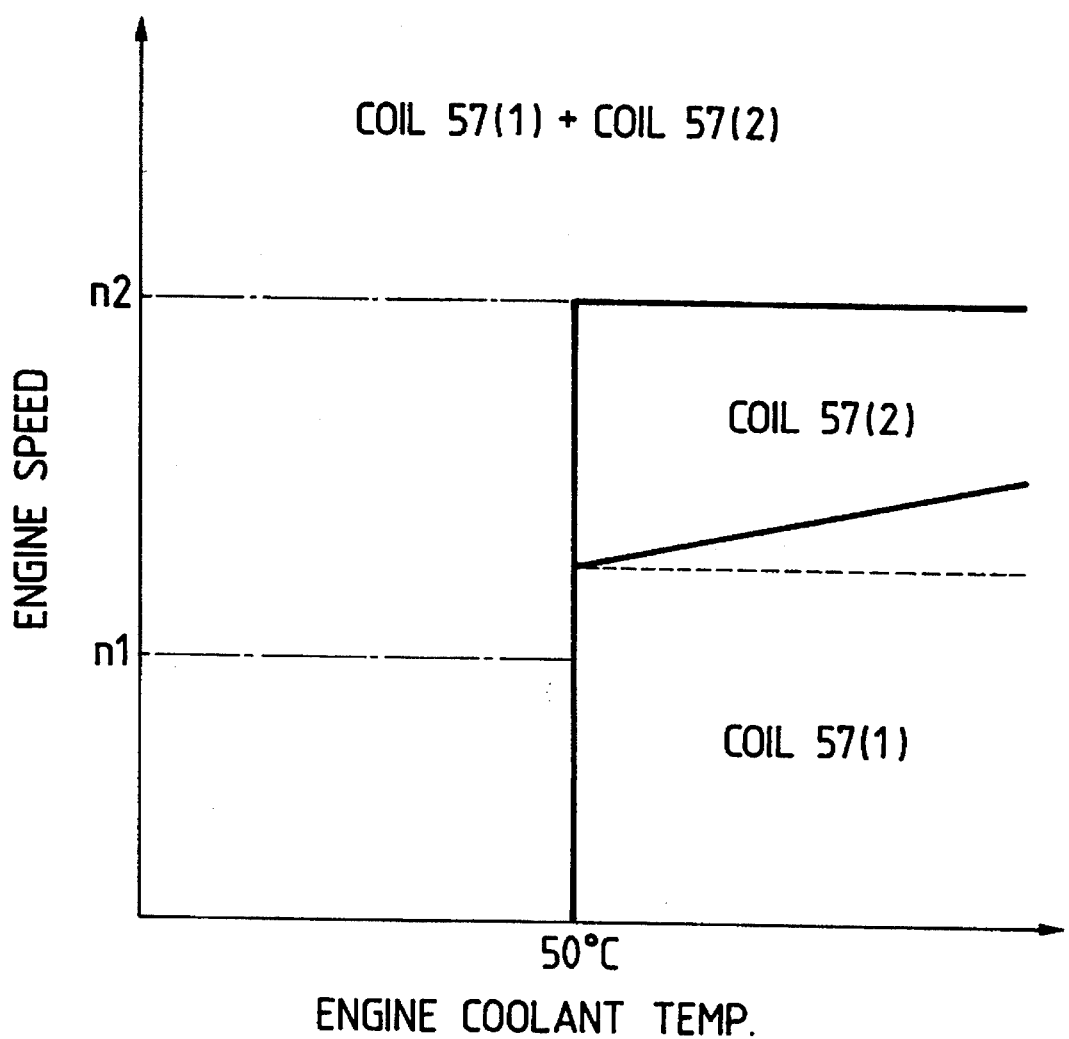
FIG. 20 is a map for selecting an exciting coil/coils of the air control valve to be energized.

In the map of FIG. 20, n1 represents an idling engine speed of 700 rpm and n2 represents an engine speed of 2,000 rpm. When the engine coolant temperature is less than 50° C. or when the engine speed is no less than 2,000 rpm (that is, before the warming up of the engine or under the engine high load), both of coils 57(1) and 57(2) are energized so as to fully open air control valve 28 as shown in FIG. 18(D). On the other hand, when the engine coolant temperature is no less than 50° C. and when the engine speed is less than 2,000 rpm, only one of the coils 57(1) and 57(2) is energized. Specifically, when the engine speed is substantially equal to the idling speed (that is, when only a small amount of assist air is required), only the coil 57(1) is energized to open air control valve 28 as shown in FIG. 18(B). On the other hand, when the engine speed is not substantially equal to the idling speed (that is, when more assist air is required, only the coil 57(2) is energized to open air control valve 28 as shown in FIG. 18(C).

After step 250, ECU 4 executes steps 300 to 1100 as in the first preferred embodiment, except that air control valve 28 is opened by energizing the coil or coils selected at step 250.

In the second preferred embodiment, step 200A in FIG. 9 reads out the engine coolant temperature and the engine speed to derive the opening degree of air control valve 28 which corresponds to the opening degree realized by energizing the coil or coils selected at the step 250 in FIG. 19 and as shown in FIGS. 18(B), 18(C) and 18(D). Accordingly, step 206 derives valve opening time TACV of air control valve 28, which is inversely proportional to the opening degree of air control valve 28 as in the first preferred embodiment.

In the second preferred embodiment, since on-off control is executed to control the opening degree of air control valve 28, the response of the opening degree control is improved over the duty-factor control in the first preferred embodiment. This is because a response delay is caused in the duty-factor control before the current value reaches a target value. As appreciated, in the second preferred embodiment, the atomization of the injected fuel is effectively accomplished by optimally preparing the map of FIG. 20.

Further, in the second preferred embodiment, the coils 57(1) and 57(2) preferably have different magnetomotive forces. However, the coils 57(1) and 57(2) may have the same magnetomotive force. In this case, air control valve 28 would have a fully-closed position, a fully-opened position and an intermediate position between the fully-closed and fully-opened positions. Further, more than two exciting coils may be provided in the air control valve 28. In this case, finer control of air control valve 28 can be accomplished. Further, the opening degree of the air control valve 28 may be set to a value other than 60%, for example, to 70% when only coil 57(2) is energized. Still further, in the map of FIG. 20, a horizontal broken line may be used instead of a slant solid line.

Further, in the second preferred embodiment, the mechanical control of opening degree of air control valve 28 as shown in FIGS. 5(A), 5(B), 6(A) and 6(B) may be omitted.

The structure of the second preferred embodiment not described above is the same as that of the first preferred embodiment.

Now, a third preferred embodiment of the present invention will be described hereinbelow.

Figure 21A:
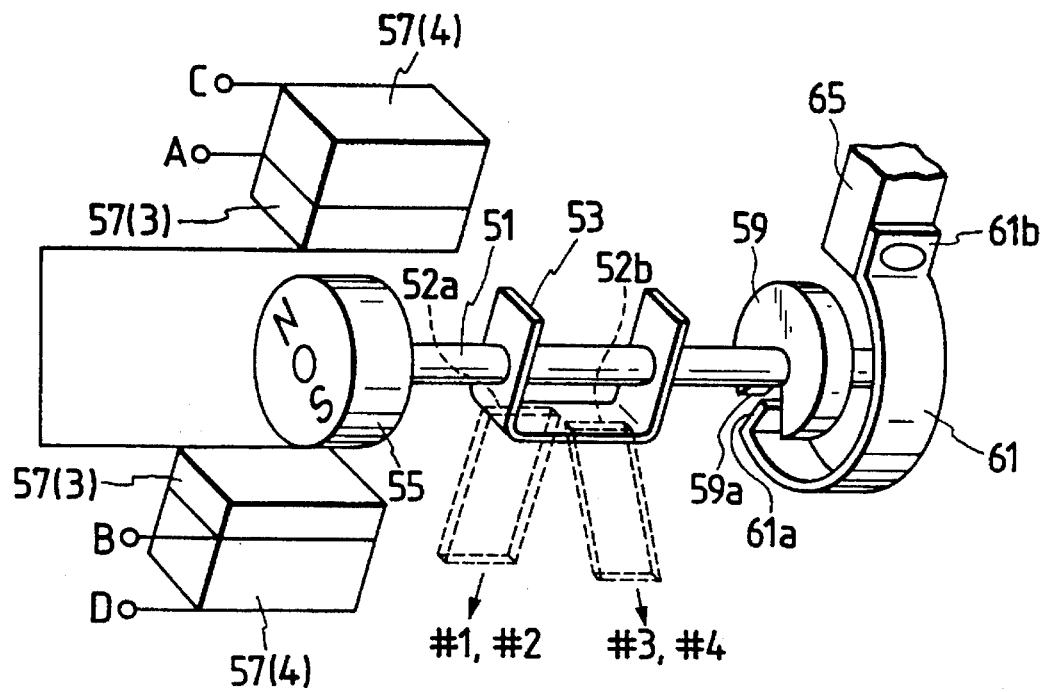
FIG. 21(A) is a schematic perspective view showing the basic structure of an air control valve to be used in a third preferred embodiment of the present invention.
Figure 21B:
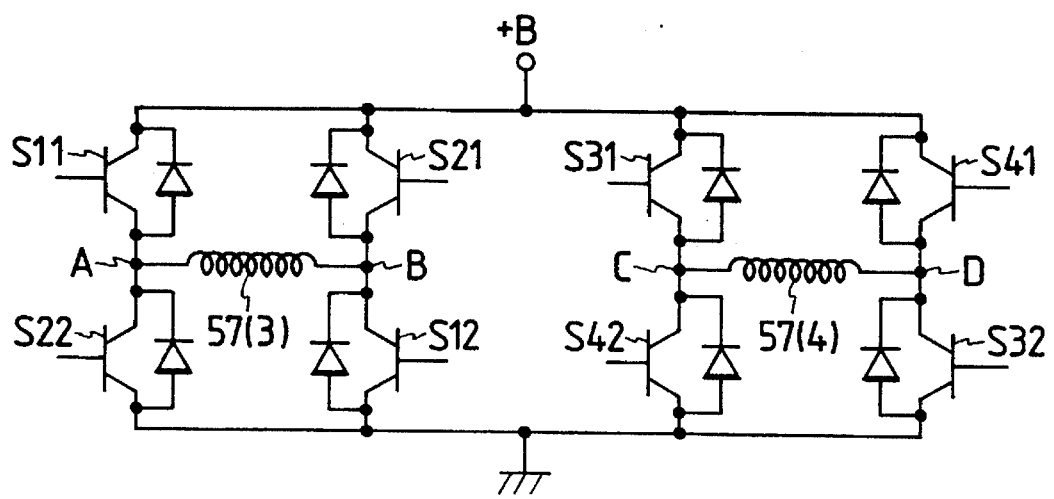
FIG. 21(B) is a diagram showing a drive circuit of the air control valve shown in FIG. 21 (A)

FIG. 21(A) is a schematic perspective view showing the structure of an air control valve 28 to be used in the third preferred embodiment. In FIG. 21(A), reference numerals or marks as those in FIG. 17 represent the same or corresponding elements in FIG. 17. FIG. 21(B) is a diagram showing a drive circuit of the air control valve 28 in FIG. 21(A). FIGS. 22(A), 22(B), 22(C) and 22(D) are diagrams, respectively, for explaining the operation of the air control valve 28 in FIG. 21(A).

In the foregoing second preferred embodiment, the air control valve 28, i.e. the rotary-type valve member 53 has one valve opening direction. In the third preferred embodiment, air control valve 28 has two opposite valve opening directions. Further, in the third preferred embodiment, air control valve 28 has two air outlets 52a and 52b instead of a single air outlet 52. Air outlet 52a communicates with engine cylinders #1 and #2. Air outlet 52b communicates with engine cylinders #3 and #4. Specifically, assist air passage 27 is bifurcated at air outlets 52a and 52b and further bifurcated at the downstream side of each of air outlets 52a and 52b such that air discharging sections 27b for engine cylinders #1 and #2 communicate with air outlet 52a and the air discharging sections 27b for engine cylinders #3 and #4 communicate with air outlet 52b. Accordingly, the air assist can be performed for each cylinder group, the first cylinder group including cylinders #1 and #2 and the second cylinder group including cylinders #3 and #4.

In the third preferred embodiment, a magnetomotive force of exciting coil 57(4) is greater than that of exciting coil 57(3) such that one of the air outlets 52a and 52b is 50% opened when only the coil 57(3) is energized, one of air outlets 52a and 52b is fully opened when the coils 57(3) and 57(4) are energized in opposite directions, and both air outlets 52a and 52b are fully opened when the coils 57(3) and 57(4) are energized in the same direction.

The operation of air control valve 28 will be described in detail hereinbelow with reference to FIGS. 21(A), 21(B) and 22(A) to 22(D). FIGS. 22(A) to 22(D) are diagrams, respectively, showing the valve positions of air control valve 28 when the air assist supply is controlled for the first cylinder group (#1, #2).

In FIG. 21(B), S11, S12, S21, S22, S31, S32, S41 and S42 are transistors working as switching elements, respectively. When assist air is supplied to the first cylinder group (#1, #2) with air outlet 52*a* 50% open as shown in FIG. 22(B), the transistors S11 and S12 are turned on. Accordingly, current flows from terminal A to terminal B so that an N-pole appears at coil 57(3) on the side of terminal A facing the permanent magnet 55 and an S-pole appears at coil 57(3) on the side of terminal B facing the permanent magnet 55. As a result, a repulsive force is generated between the permanent magnet 55 and the coil 57(3), so that the air control valve 28 is opened as shown in FIG. 22(B). On the other hand, when assist air is supplied to the first cylinder group (#1, #2) with air outlet 52*a* being fully opened as shown in FIG. 22(C), transistors S31 and S32 and transistors S21 and S22 are turned on. Accordingly, coils 57(3) and 57(4) are energized with current flowing in opposite directions. However, since the magnetomotive force of coil 57(4) is greater than that of coil 57(3) as described above, a magnetic field corresponding to the difference between the magnetomotive forces of the coils 57(3) and 57(4) is generated around a coil unit, i.e. the coils 57(3) and 57(4). Specifically, an N-pole appears at the coil unit on the side of terminal A (C) facing permanent magnet 55 and an S-pole appears at the coil unit on the side of terminal B (D) facing permanent magnet 55. As a result, a repulsive force is generated between permanent magnet 55 and the coil unit so that air control valve 28 is opened as shown in FIG. 22(C).

Figure 22A:
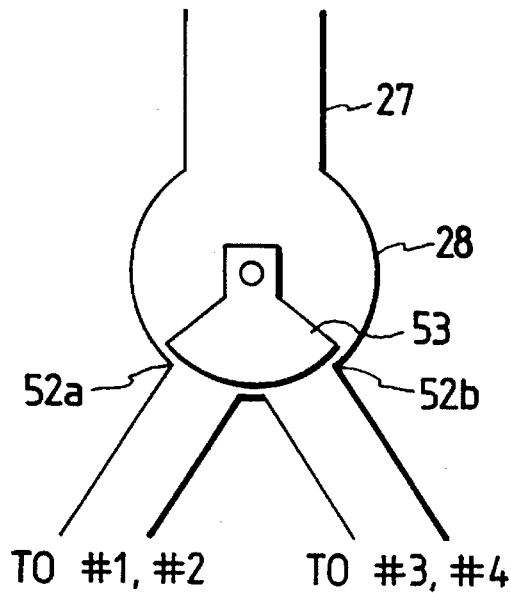
FIGS. 22(A), 22(B), 22(C) and 22(D) are diagrams, respectively, explaining the operation of the air control valve shown in FIG. 21(A)
Figure 22B:
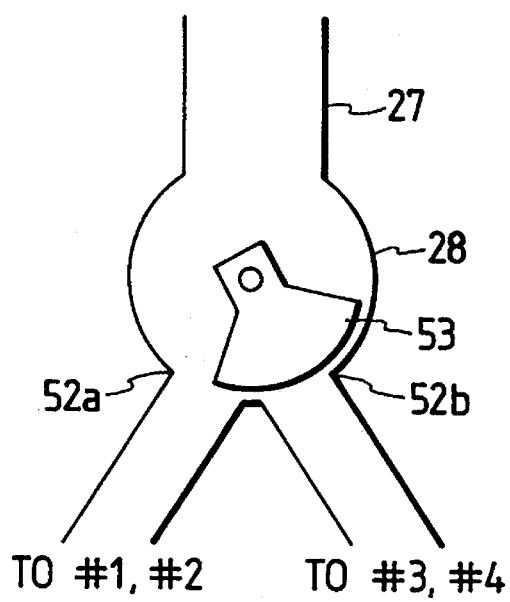
Figure 22C:
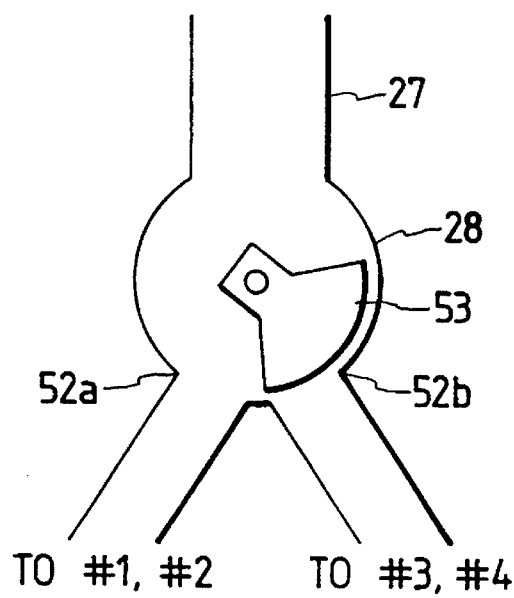
Figure 22D:
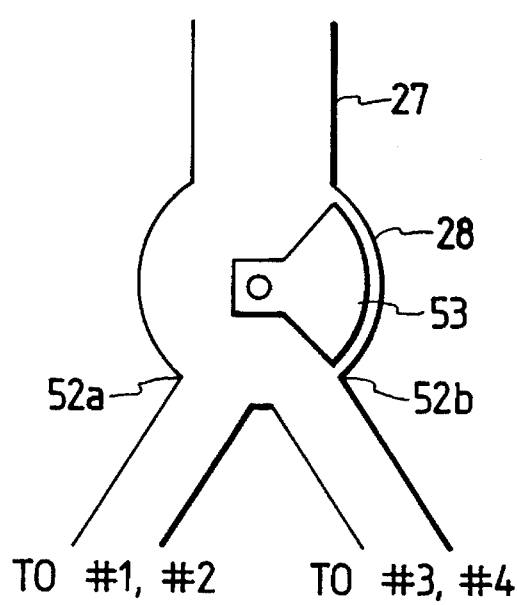

Further, when assist air is supplied to the first and second cylinder groups (#1, #2, #3, #4) with air outlets 52*a* and 52*b* fully opened as shown in FIG. 22(D), transistors S11, S12, S31 and S32 are turned on. Accordingly, coils 57(3) and 57(4) are energized in the same direction so that a combined repulsive force is generated between the permanent magnet 55 and the coil unit. As a result, air control valve 28 is opened as shown in FIG. 22(D).

As appreciated, when controlling air control valve 28, (the valve member 53) in a valve opening direction opposite to that shown in FIGS. 22(A) to 22(D) to control the supply of assist air to the second cylinder group (#3, #4), coil 57(3) is energized with current flowing in a direction opposite to that corresponding to FIG. 22(B), coils 57(3) and 57(4) are energized with current flowing in directions, respectively, opposite to those corresponding to FIG. 22(C), and coils 57(3) and 57(4) are energized with current flowing in a direction opposite to that corresponding to FIG. 22(D). In these cases, an S-pole appears at the coil unit on the side of terminal A (C) facing permanent magnet 55 and N-pole appears at the coil unit on a side of terminal B (D) facing the permanent magnet 55 so that air control valve 28 is opened by means of an attractive force between permanent magnet 55 and the coil unit. When none of the coils 57(3) and 57(4) are energized, air control valve 28 fully closes air outlets 52*a* and 52*b* as shown in FIG. 22(A).

FIG. 23 shows a flowchart of a control routine executed by ECU 4 for controlling the opening degree and direction of air control valve 28 according to the third preferred embodiment. In the flowchart of FIG. 23, step 250 in the flowchart of FIG. 19 is replaced by step 250'. The third preferred embodiment will be described hereinbelow, mainly referring to the differences from the second preferred embodiment.

Figure 24A:
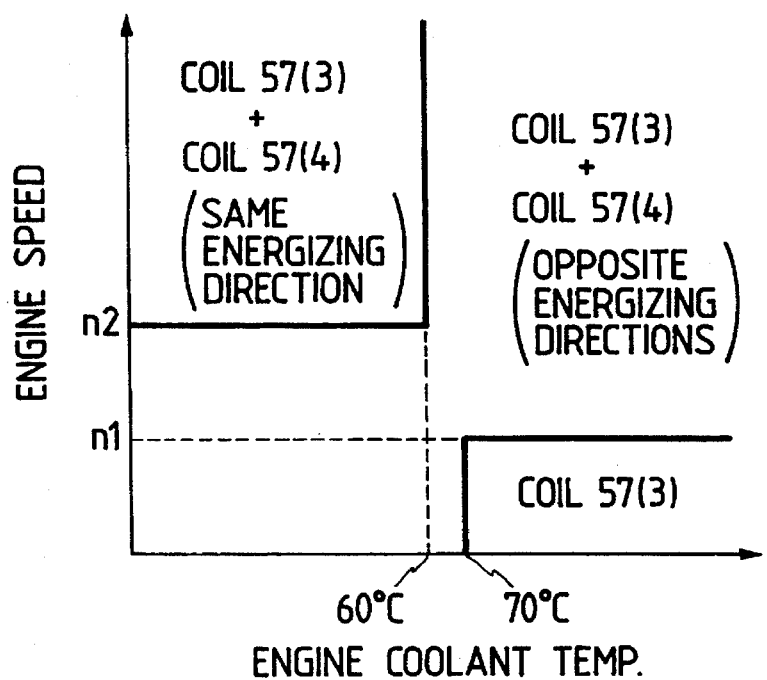
FIG. 24(A) is a map for selecting an exciting coil/coils of the air control valve to be energized.

In FIG. 23, steps 100 and 200 derive the valve opening time (TAU+TAUV) of fuel injection valve 26 and the valve opening time TACV of air control valve 28 as in the second preferred embodiment. Thereafter, the routine proceeds to the step 250' which determines the coil or coils to be energized, using a map of FIG. 24(A), so as to provide an opening degree of air control valve 28 based on the operating condition of the engine 2. The map of FIG. 24(A) is prestored in ROM 4*b* and defines the coil or coils to be energized in terms of the engine coolant temperature and the engine speed. Step 250' further determines the current flow direction or directions for energizing the coil unit, that is, the opening direction of air control valve 28, based on an engine cylinder to be injected with fuel (hereinafter referred to as "injection cylinder"). As appreciated, the opening direction of air control valve 28 controls the air assist relative to the cylinder group including the injection cylinder.

In the map of FIG. 24(A), when the engine speed is no less than n2 (for example, 2,000 rpm) and the engine coolant temperature is less than 60° C., coils 57(3) and 57(4) are energized with the current flowing in the same direction so that air control valve 28 fully opens both of the air outlets 52*a* and 52*b* as shown in FIG. 22(D). On the other hand, when the engine speed is less than 1,000 rpm which is higher than n1 (idling speed, for example, 700 rpm) by a given speed (for example, 300 rpm) and the engine coolant temperature is no less than 70° C., only coil 57(3) is energized so that air control valve 28 opens one of the air outlets 52*a* and 52*b* by 50% as shown in FIG. 22(B). Further, in a condition other than the foregoing conditions, coils 57(3) and 57(4) are energized with current flowing in opposite directions so that air control valve 28 fully opens one of the air outlets 52*a* and 52*b* as shown in FIG. 22(C).

Since the fuel injection time is long when the engine temperature is low, when the engine speed is high, it is difficult to precisely perform the switching operation of air control valve 28 between the air outlets 52*a* and 52*b*. Accordingly, in this condition, coils 57(3) and 57(4) are energized in the same direction to fully open both air outlets 52*a* and 52*b*. On the other hand, during a low engine speed after warm up, since the required assist air amount is small, only coil 57(3) is energized to open one of the air outlets 52*a* and 52*b* by 50%. This works to reduce pulsation noise by reducing pressure variation caused by the operation of the air control valve 28.

After the execution of step 250', ECU 4 executes steps 300 to 1100 as in the second preferred embodiment, except that air control valve 28 is opened by energizing the coil or coils selected at step 250' with current flow direction or directions step 250'.

In the third preferred embodiment, step 200A in the flowchart of FIG. 9 reads out the engine coolant temperature and the engine speed to determine the opening degree of air control valve 28 such that the opening degree is 100% when one or both of air outlets 52*a* and 52*b* are fully opened and 50% when one of air outlets 52*a* and 52*b* is opened by 50%.

Figure 24B:
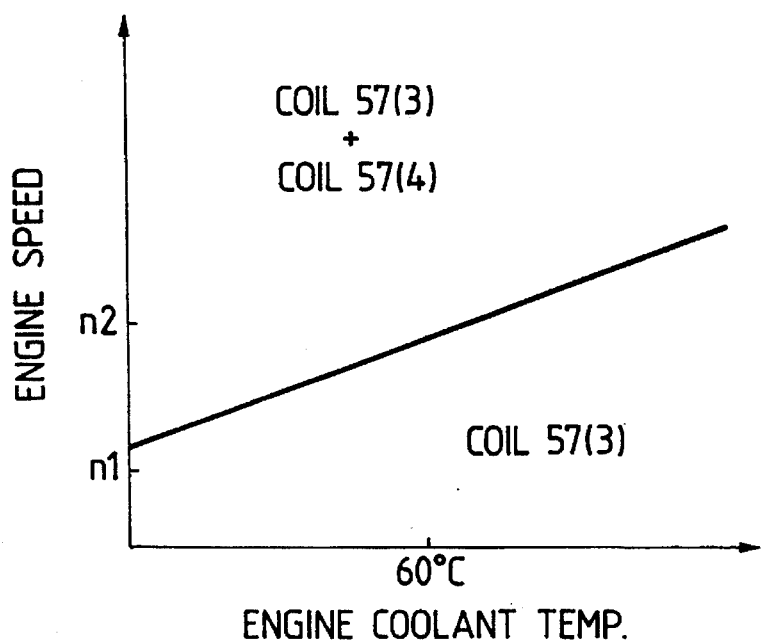
FIG. 24 (B) is a map for selecting an exciting coil/coils of the air control valve to b energized.

The map characteristic is not limited to that shown in FIG. 24(A), and the corresponding opening degrees of the air control valve 28 are not limited as described above. For example, coils 57(3) and 57(4) may have the same magnetomotive force, and the map characteristic may be set as shown in FIG. 24(B). This map characteristic tends to allow both coils 57(3) and 57(4) to be energized to fully open both air outlets 52*a* and 52*b* as the engine speed increases or as the engine coolant temperature decreases. When only coil 57(3) is energized, air control valve 28 fully opens one of air outlets 52*a* or 52*b* according to the injection cylinder.

As in the second preferred embodiment, the mechanical control of the opening degree of air control valve 28 as shown in FIGS. 5(A), 5(B), 6(A) and 6(B) may be omitted in the third preferred embodiment.

The structure of the third preferred embodiment not described above is the same as that of the second preferred embodiment.

It is to be understood that this invention is not to be limited to the preferred embodiments and modifications described above, and that various changes and modifications may be made without departing from the spirit and scope of the invention as defined in the appended claims.

What is claimed is:

1. An assist air control system for an internal combustion engine, comprising:

an assist air passage for establishing communication between an upstream side of a throttle valve in an intake pipe and an injection hole of a fuel injection valve, bypassing said throttle valve;

open-close means, provided in said assist air passage, for opening and closing said assist air passage;

open-close control means for controlling the opening and closing of said open-close means; and opening degree limiting means for limiting an opening degree of said open-close means when opening said assist air passage, to a first value that is reduced as an engine temperature increases above a predetermined level, while being increased as an engine load increases.

2. The assist air control system as set forth in claim 1, wherein said opening degree limiting means comprises a mechanical limiting mechanism for mechanically limiting said opening degree to said first value, and said open-close control means comprises opening degree determining means for determining a second value of said opening degree of said open-close means smaller than said first value, and opening operation control means for controlling the opening operation of said open-close means based on said second value.

3. The assist air control system as set forth in claim 2, wherein said mechanical limiting mechanism is mechanically connected to the throttle valve so as to vary said first value in response to an opening degree of said throttle valve.

4. The assist air control system as set forth in claim 2, wherein said mechanical limiting mechanism includes a heat-sensitive member so as to vary said first value in response to the engine temperature.

5. The assist air control system as set forth in claim 2, wherein an opening time of said open-close means is inversely proportional to said second value.

6. The assist air control system as set forth in claim 1, wherein said first value is constant when the engine temperature is less than said predetermined level.

7. An assist air control system for an internal combustion engine, comprising:

an assist air passage for establishing communication between an upstream side of a throttle valve in an intake pipe and an injection hole of a fuel injection valve, bypassing said throttle valve;

open-close means, provided in said assist air passage, for opening and closing said assist air passage; and open-close control means for controlling the opening and closing operation of said open-close means, said open-close control means limiting an opening degree of said open-close means when opening said assist air passage, to a value that is reduced as an engine temperature increases, while increased as an engine load increases.

8. The assist air control system as set forth in claim 7, wherein said open-close control means includes a plurality of drive means for driving said open-close means, and wherein said value is variably set by selecting a combination of operating and non-operating states of said drive means.

* * * * *